(12) United States Patent
Mahbub et al.

(10) Patent No.: US 11,381,743 B1
(45) Date of Patent: Jul. 5, 2022

(54) REGION OF INTEREST CAPTURE FOR ELECTRONIC DEVICES

(71) Applicant: QUALCOMM Incorporated, San Diego, CA (US)

(72) Inventors: Upal Mahbub, San Diego, CA (US); Daniel James Guest, San Diego, CA (US); Walker Curtis, San Diego, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/478,429

(22) Filed: Sep. 17, 2021

(51) Int. Cl.
*H04N 5/232* (2006.01)
*H04N 5/235* (2006.01)
*H04N 5/225* (2006.01)

(52) U.S. Cl.
CPC ..... *H04N 5/232411* (2018.08); *H04N 5/2258* (2013.01); *H04N 5/2353* (2013.01); *H04N 5/23245* (2013.01); *H04N 5/232945* (2018.08)

(58) Field of Classification Search
CPC .......... H04N 1/00891; H04N 1/00896; H04N 5/2258; H04N 5/23245; H04N 5/23241; H04N 5/232411; H04N 5/232945; H04N 5/2353
See application file for complete search history.

(56) References Cited

U.S. PATENT DOCUMENTS

| | | | | |
|---|---|---|---|---|
| 2015/0241987 A1* | 8/2015 | Liu | ......................... | G06F 3/017 345/156 |
| 2020/0275031 A1* | 8/2020 | Park | ..................... | H04N 13/243 |
| 2020/0396383 A1* | 12/2020 | Moloney | .............. | G06V 10/147 |
| 2021/0176405 A1* | 6/2021 | Ishii | ................... | H04N 5/23245 |

* cited by examiner

*Primary Examiner* — Daniel M Pasiewicz
(74) *Attorney, Agent, or Firm* — Polsinelli LLP

(57) ABSTRACT

Systems, methods, and non-transitory media are provided for capturing a region of interest (ROI) with a multi-camera system. An example method can include initializing image sensors of an electronic device, each image sensor being initialized in a lower-power mode having a lower power consumption than a higher-power mode supported by one or more of the image sensors; obtaining images captured by the image sensors in the lower-power mode; determining, based on the images, that an ROI in a scene is within a field-of-view (FOV) of a first image sensor from the image sensors; based on determining that the ROI is within the FOV of the first image sensor, decreasing the lower-power mode of one or more second image sensors to a power-off mode or an additional lower-power mode having a lower power consumption than the lower-power mode; and capturing, using the first image sensor, an image of the ROI.

37 Claims, 10 Drawing Sheets

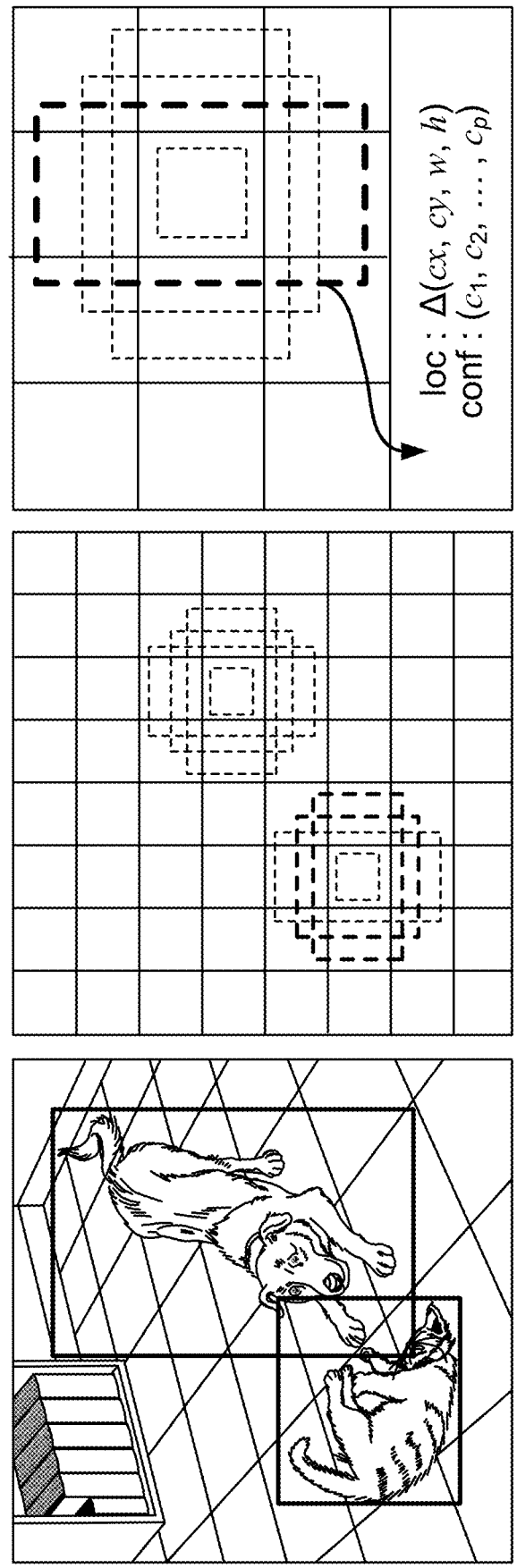

REGION OF INTEREST CAPTURE FOR ELECTRONIC DEVICES

TECHNICAL FIELD

The present disclosure generally relates to camera devices. For example, aspects of the present disclosure relate to controlling a region-of-interest camera capture for multi-camera devices.

BACKGROUND

Electronic devices are increasingly equipped with camera hardware to capture images and/or videos for consumption. For example, a computing device can include a camera (e.g., a mobile device such as a mobile telephone or smartphone including one or more cameras) to allow the computing device to capture a video or image of a scene, person, object, etc. The image or video can be captured and processed by the computing device (e.g., a mobile device, IP camera, extended reality device, connected device, security system, etc.) and stored and/or output for consumption (e.g., displayed on the device and/or another device). In some cases, the image or video can be further processed for effects (e.g., compression, image enhancement, image restoration, scaling, framerate conversion, noise reduction, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

In some cases, an electronic device can process images to detect objects, faces, events, and/or any other items captured by the images. The object detection can be useful for various applications such as, for example, authentication, automation, gesture recognition, surveillance, extended reality, computer vision, among others. In some examples, the electronic device can implement a lower-power or "always-on" (AON) camera that persistently or periodically operates to automatically detect certain objects in an environment. The lower-power camera can be implemented for a variety of use cases such as, for example, persistent gesture detection, persistent object (e.g., face/person, animal, vehicle, device, plane, event, etc.) detection, persistent object scanning (e.g., quick response (QR) code scanning, barcode scanning, etc.), persistent facial recognition for authentication, etc. In many cases, the imaging, processing, and/or performance capabilities/results of the lower-power camera can be limited. Accordingly, in some cases, the electronic device may also implement a higher-power camera with higher imaging, processing, and/or performance capabilities/results, which the electronic device may use at certain times and/or in certain scenarios when higher imaging, processing, and/or performance capabilities/results are desired.

BRIEF SUMMARY

Systems and techniques are described herein for efficient and stable region-of-interest capture for electronic devices. According to at least one example, a method is provided for capturing a region of interest (ROI) with a multi-camera system. The method can include: initializing a plurality of image sensors of an electronic device, each image sensor of the plurality of image sensors being initialized in a first lower-power mode associated with a first lower power consumption that is lower than a higher-power mode supported by one or more image sensors of the plurality of image sensors; obtaining a plurality of images captured by the plurality of image sensors in the first lower-power mode; determining, based on the plurality of images, that a region-of-interest (ROI) in a scene is within a field-of-view (FOV) of a first image sensor from the plurality of image sensors; based on the determining that the ROI is within the FOV of the first image sensor, decreasing the first lower-power mode of one or more second image sensors from the plurality of image sensors to one of a power-off mode or a second lower-power mode associated with a second lower power consumption that is lower than the first lower-power mode; and capturing, using the first image sensor, one or more images of the ROI.

According to at least one example, an apparatus is provided for capturing a region of interest (ROI) with a multi-camera system. The apparatus can include memory and one or more processors configured to: initialize a plurality of image sensors of an electronic device, each image sensor of the plurality of image sensors being initialized in a first lower-power mode associated with a first lower power consumption that is lower than a higher-power mode supported by one or more image sensors of the plurality of image sensors; obtain a plurality of images captured by the plurality of image sensors in the first lower-power mode; determine, based on the plurality of images, that a region-of-interest (ROI) in a scene is within a field-of-view (FOV) of a first image sensor from the plurality of image sensors; based on determining that the ROI is within the FOV of the first image sensor, decrease the first lower-power mode of one or more second image sensors from the plurality of image sensors to one of a power-off mode or a second lower-power mode associated with a second lower power consumption that is lower than the first lower-power mode; and capture, using the first image sensor, one or more images of the ROI.

According to at least one example, a non-transitory computer-readable medium is provided for capturing a region of interest (ROI) with a multi-camera system. The non-transitory computer-readable medium can include instructions that, when executed by one or more processors, cause the one or more processors to: initialize a plurality of image sensors of an electronic device, each image sensor of the plurality of image sensors being initialized in a first lower-power mode associated with a first lower power consumption that is lower than a higher-power mode supported by one or more image sensors of the plurality of image sensors; obtain a plurality of images captured by the plurality of image sensors in first the lower-power mode; determine, based on the plurality of images, that a region-of-interest (ROI) in a scene is within a field-of-view (FOV) of a first image sensor from the plurality of image sensors; based on determining that the ROI is within the FOV of the first image sensor, decrease the first lower-power mode of one or more second image sensors from the plurality of image sensors to one of a power-off mode or a second lower-power mode associated with a second lower power consumption that is lower than the first lower-power mode; and capture, using the first image sensor, one or more images of the ROI.

According to at least one example, another apparatus is provided for capturing a region of interest (ROI) with a multi-camera system. The apparatus can include: means for initializing a plurality of image sensors of an electronic device, each image sensor of the plurality of image sensors being initialized in a first lower-power mode associated with a first lower power consumption that is lower than a higher-power mode supported by one or more image sensors of the plurality of image sensors; means for obtaining a plurality of images captured by the plurality of image sensors in the first lower-power mode; means for determining, based on the plurality of images, that a region-of-interest (ROI) in a scene is within a field-of-view (FOV) of a first image sensor from the plurality of image sensors; means for, based on determining that the ROI is within the FOV of the first image sensor, decreasing the first lower-power mode of one or more second image sensors from the plurality of image sensors to one of a power-off mode or a second lower-power mode associated with a second lower power consumption that is lower than the first lower-power mode; and means for capturing, using the first image sensor, one or more images of the ROI.

In some aspects, the method, non-transitory computer-readable medium, and apparatuses described above can transition, based on determining that the ROI is within the FOV of the first image sensor, the first image sensor from the first lower-power mode to the higher-power mode; and capture the one or more images of the ROI using the first image sensor in the higher-power mode.

In some examples, transitioning the first image sensor from the first lower-power mode to the higher-power mode can include adjusting, based on determining that the ROI is within the FOV of the first image sensor, a first exposure setting of the first image sensor; and based on a determination that the ROI is outside of one or more FOVs of the one or more second image sensors, adjusting at least one of a sleep setting and a second exposure setting of the one or more second image sensors.

In some examples, transitioning the first image sensor from the first lower-power mode to the higher-power mode can include processing data from the one or more second image sensors using one or more resources having a lower power consumption than one or more other resources used to process the one or more images captured by the first image sensor.

In some examples, transitioning the first image sensor from the first lower-power mode to the higher-power mode can include at least one of turning off the one or more second image sensors, reducing a resolution of the one or more second image sensors, and reducing a framerate of the one or more second image sensors.

In some aspects, the method, non-transitory computer-readable medium, and apparatuses described above can determine that the ROI is within an overlapping portion of the FOV of the first image sensor and a different FOV of a second image sensor from the plurality of image sensors; determine a first power cost associated with the first image sensor and a second power cost associated with the second image sensor; and adjust a power mode of the first image sensor and the second image sensor based on the first power cost and the second power cost.

In some examples, adjusting the power mode of the first image sensor and the second image sensor can include increasing the power mode of the second image sensor, the second image sensor having a lower power cost than the second image sensor; and decreasing the power mode of the first image sensor.

In some examples, determining the first power cost and the second power cost can include applying a first weight associated with the first image sensor to the first power cost and a second weight associated with the second image sensor to the second power cost.

In some cases, the first weight and the second weight are based on at least one of a respective image quality attribute associated with the first image sensor and the second image sensor, a respective power consumption associated with the first image sensor and the second image sensor, and one or more respective processing capabilities associated with the first image sensor and the second image sensor.

In some aspects, the method, non-transitory computer-readable medium, and apparatuses described above can capture an image of the ROI using the second image sensor, wherein the second image sensor is associated with a lower image quality attribute than the first image sensor; and adjust, using a neural network, one or more visual characteristics of the image based on at least one of the image, at least an additional image of the ROI captured by the first image sensor, and motion information associated with the image.

In some aspects, the method, non-transitory computer-readable medium, and apparatuses described above can initialize one or more object detectors for one or more image sensors from the plurality of image sensors, the one or more object detectors being initialized in a first mode associated with a third lower-power consumption that is lower than a second mode supported by the one or more object detectors; determine that the ROI is outside of a second FOV of each of the one or more image sensors; and based on determining that the ROI is outside of the second FOV of each of the one or more image sensors, run the one or more image sensors in the first lower-power mode with the one or more object detectors in the first mode associated with the third lower-power consumption.

In some aspects, the method, non-transitory computer-readable medium, and apparatuses described above can determine that the ROI is within respective FOVs of a set of image sensors from the plurality of image sensors; coordinate a capture of camera exposures across at least a portion of the set of image sensors; and generate one or more images based on the camera exposures captured using at least the portion of the set of image sensors.

In some aspects, the method, non-transitory computer-readable medium, and apparatuses described above can determine, based on a movement of at least one of the electronic device and the ROI, that the ROI is outside of the FOV of the first image sensor and within a different FOV of a second image sensor from the plurality of image sensors; based on determining that the ROI is outside of the FOV of the first image sensor and within the different FOV of the second image sensor, reduce a power mode associated with the first image sensor and increase an additional power mode associated with the second image sensor; and capture, by the second image sensor, one or more additional images of the ROI.

In some examples, increasing the additional power mode associated with the second image sensor can include at least one of turn on the second image sensor, increase a resolution of the second image sensor, increase a framerate of the second image sensor, and process data from the second image sensor using one or more resources having a higher power consumption than one or more different resources associated with the reduced power mode associated with the first image sensor.

In some aspects, the method, non-transitory computer-readable medium, and apparatuses described above can determine, based on a movement of at least one of the electronic device and the ROI, that the ROI is within a first portion of the FOV of the first image sensor and a second portion of a different FOV of a second image sensor from the plurality of image sensors; determine a trajectory of the ROI relative to the FOV and the different FOV; based on the trajectory of the ROI, switch from the first image sensor to the second image sensor, wherein switching from the first image sensor to the second image sensor can include reducing a power mode associated with the first image sensor and increasing an additional power mode associated with the second image sensor; and capture, by the second image sensor, one or more additional images of the ROI.

In some aspects, the method, non-transitory computer-readable medium, and apparatuses described above can track a location of the ROI based on the one or more images captured by the first image sensor; and adjust one or more power modes associated with one or more image sensors from the plurality of image sensors, the one or more power modes being adjusted based on the location of the ROI and one or more properties of the one or more image sensors.

In some aspects, each of the apparatuses described above is, can be part of, or can include a mobile, device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures:

FIG. 7A-FIG. 7C are diagrams illustrating an example of a single-shot object detector, in accordance with some examples of the present disclosure;

DETAILED DESCRIPTION

Figure 1:
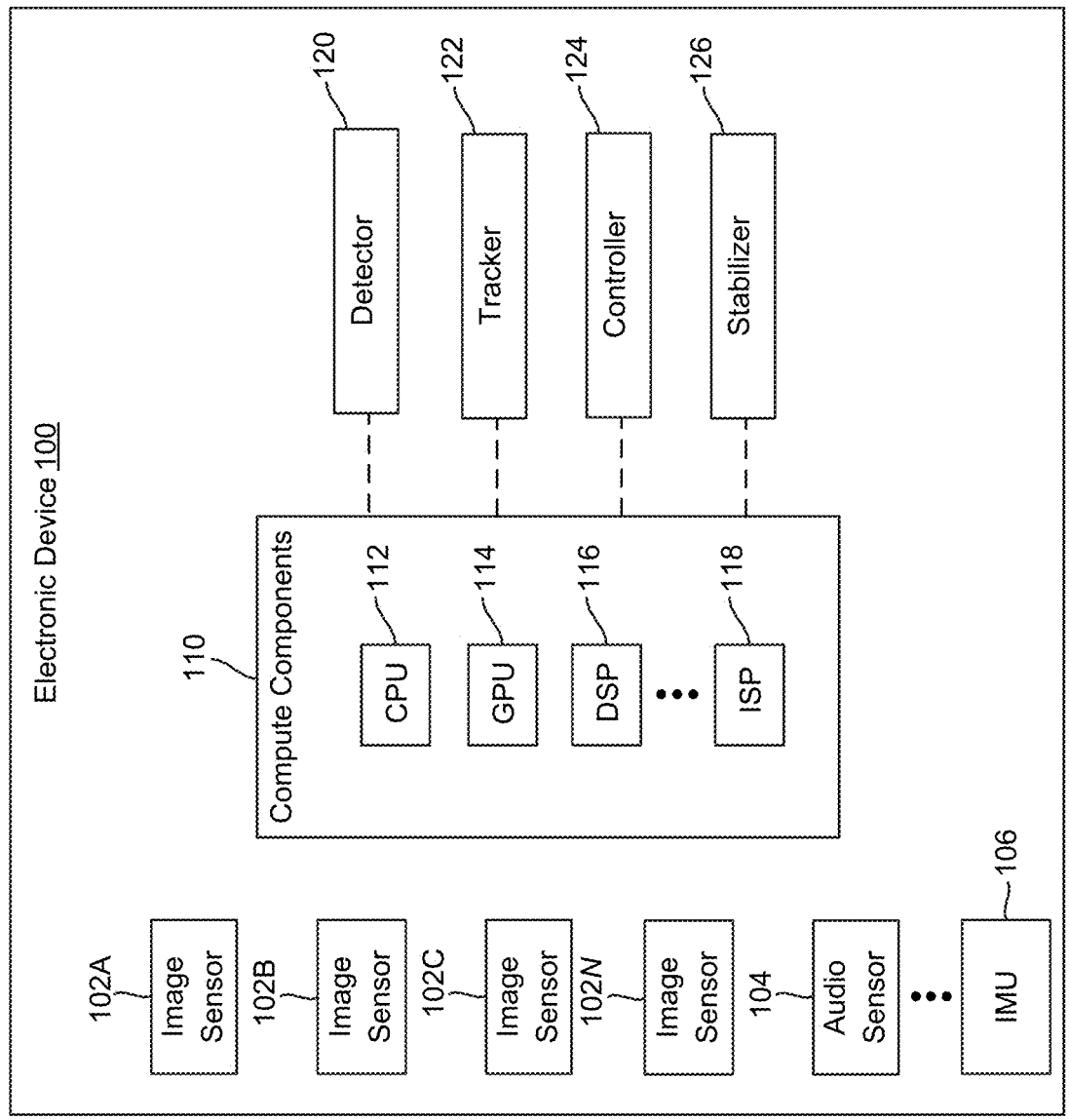
FIG. 1 is a diagram illustrating an example of an electronic device that can implement aspects of the systems and techniques described herein, in accordance with some examples of the present disclosure.

Certain aspects and embodiments of this disclosure are provided below. Some of these aspects and embodiments may be applied independently, and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Electronic devices (e.g., mobile phones, wearable devices (e.g., smart watches, smart bracelets, smart glasses, etc.), tablet computers, extended reality (XR) devices (e.g., virtual reality (VR) devices, augmented reality (AR) devices, and the like), connected devices, laptop computers, etc.) can implement cameras to capture, detect and/or recognize regions of interest (ROIs). For example, electronic devices can implement lower-power cameras to capture, detect and/or or recognize ROIs on demand, on an ongoing or periodic basis, etc. Example ROIs can include areas/portions of a scene in an environment, objects in a scene, events of interest in a scene, etc. Events of interest can include, for example, gestures (e.g., hand gestures, smiles, etc.), an action (e.g., by a device, person, and/or animal), a presence or occurrence of one or more objects, etc. An object associated with an ROI and/or an event of interest can include and/or refer to, for example, and without limitation, a face, a code (e.g., a quick response (QR) code, a barcode, etc.), a document, a scene or environment, a link, a machine-readable code, a crowd, etc. The lower-power cameras can implement lower-power hardware and/or energy-efficient image processing software/pipelines used to capture image data, process the captured image data, etc. The lower-power cameras can remain on or "wake up" to watch movement and/or objects in a scene and detect events in the scene while using less battery power than other devices such as higher-power cameras.

In some examples, a lower-power camera (sometimes referred to as an "always-on" (AON) camera) can persistently or periodically operate to automatically capture and/or detect certain objects/events in an environment. Moreover, the lower-power camera can be configured to draw a lower amount of power and compute resources than a higher-power or "main" camera. For example, lower-power camera pipelines can employ a lower/reduced resolution, a lower-power image sensor, lower-power memory resources (e.g., on-chip static random-access memory (SRAM) as opposed to dynamic random-access memory (DRAM), etc.), island voltage rails to reduce leakage, ring oscillators for clock sources (e.g., as opposed to phase-locked loops), lower-power physical interfaces, lower-power image processing operations, etc., to enable persistent or periodic imaging with limited/reduced power consumption as compared to higher-power or "main" camera pipelines. In some cases, to further reduce power consumption and/or resource utilization, lower-power camera pipelines may not implement certain operations (e.g., noise reduction, image warping, image enhancement, etc.), may not process certain types of data (e.g., color image data as opposed to mono/luma data), may not employ certain hardware (e.g., downscalers, color converters, lens distortion correction hardware, digital signal processors, neural processors, neural network accelerators, higher-power physical interfaces such as a mobile industry processor interface (MIPI) camera serial interface (CSI), certain computer vision blocks, etc.).

Generally, the imaging, processing, and/or performance capabilities and results of the lower-power camera can be lower than those of a higher-power camera. For example, lower-power cameras may produce lower quality images/videos than higher-power cameras and/or may provide more limited features and/or effects than higher-power cameras. Accordingly, in some cases, in addition to implementing a lower-power camera, an electronic device may also implement a higher-power camera that supports higher imaging, processing, and/or performance capabilities/results than the lower-power camera. In some cases, an electronic device can implement a camera device in a lower-power mode at certain times and a higher-power mode at other times. In some examples, the electronic device may use such a higher-power camera and/or higher-power mode at certain times and/or in certain scenarios when higher imaging, processing, and/or performance capabilities/results are desired.

An illustrative example of an electronic device equipped with one or more cameras can include an extended reality (e.g., augmented reality, virtual reality, etc.) device, such as smart glasses and head-mounted displays (HMDs). Extended reality (XR) devices generally implement cameras and a variety of sensors to track the position of the XR device and other objects within the physical environment. The XR devices can use such tracking information to provide a user of the XR device a realistic XR experience. For example, an XR device can allow a user to experience or interact with immersive virtual environments or content. To provide realistic XR experiences, XR technologies generally aim to integrate virtual content with the physical world. In some cases, XR technologies can match the relative pose and movement of objects and devices. For example, an XR device can use tracking information to calculate the relative pose of devices, objects, and/or maps of the real-world environment in order to match the relative position and movement of the devices, objects, and/or the real-world environment. Using the pose and movement of one or more devices, objects, and/or the real-world environment, the XR device can anchor content to the real-world environment in a convincing manner. The relative pose information can be used to match virtual content with the user's perceived motion and the spatio-temporal state of the devices, objects, and real-world environment.

Electronic devices such as XR devices are often mobile and can move while performing operations, such as image/video capturing, object detection, tracking, etc. Such movement can cause erratic, disorienting, and/or undesirable motion in the captured image/video. In some cases, the relative movement of an electronic device and a region-of-interest (ROI) being captured and/or tracked by one or more cameras of the electronic device can cause the ROI to be outside of the field-of-view (FOV) of the one or more cameras, which can interrupt the electronic device's ability to continue capturing or tracking the ROI. For example, many XR devices, such as XR glasses and HMDs, can be worn by users on the users' head during an operation of the XR devices. Such head-worn XR devices can follow the motion of the wearer's head. The motion of the wearer's head can cause motion in images captured by the XR device and changes in the FOV of cameras on the XR device. The change in the FOV of cameras can cause the ROI being captured and/or tracked by one or more cameras to be outside of the FOV of the one or more cameras.

In one illustrative example, a user wearing an XR device (e.g., an HMD, XR glasses, etc.) can use the XR device to record a concert. When the user wearing the XR device moves (e.g., laughs, turns, etc.) while recording the concert, the cameras of the XR device can shake, causing motion in the feed from the cameras. When the user wearing the XR device moves while recording the concert, the XR device and the cameras of the XR device can follow the user's movement. Such movement can change the FOV of the cameras such that the concert is no longer within the FOV of the cameras, is in the periphery of the FOV of the cameras, or is in the FOV of one or more different cameras than before the movement. In some cases, such movement can interrupt the XR device's ability to continue capturing or tracking the ROI.

In some cases, an electronic device such as an XR device can implement multiple cameras to, among other things, obtain a larger FOV for greater visibility. The larger FOV can prevent or limit such interruptions in the capturing or tracking of an ROI caused by changes in the relative position of the electronic device and the ROI. The electronic device can use the multiple cameras to capture frames (e.g., images) from different camera FOVs and can use the different frames to capture and/or track the ROI even when the relative position of the electronic device and the ROI changes. However, the increased number of frames from the different camera FOVs can result in a higher number of frames that do not capture the ROI because the cameras used to capture those frames do not have visibility to the ROI (e.g., the ROI is outside of the FOV of the cameras). Such frames may be unnecessary and are often discarded since they do not capture the ROI. The capturing, processing, and/or discarding of such frames can increase the processing time of data at the electronic device, power consumption at the electronic device, streaming bandwidth at the electronic device, and/or use of resources such as memory and compute resources. Moreover, a larger number of cameras implemented by the electronic device can increase power consumption and/or the computational and memory complexity at the electronic device, particularly as more cameras are operated simultaneously.

Systems, apparatuses, methods (also referred to as processes), and computer-readable media (collectively referred to herein as "systems and techniques") are described herein for efficient and stable capture of ROIs by multi-camera systems such as XR devices and other electronic devices. In some examples, the systems and techniques described herein can reduce the number of frames and cameras in a multi-camera system used to detect, track, and/or stabilize a ROI at any given time. In some cases, the systems and techniques described herein can decouple the ROI definition from cameras and other sensors on a device, such as an XR device and allow efficient use of resources while providing stabilized salient camera streams for local clients and/or remote and time-shifted viewers. In some examples, an XR device can determine where an ROI(s) lie at any given time using information calculated about the pose of the XR device (e.g., the pose of the head of the user wearing the XR device), an eye gaze of the user wearing the XR device, and/or a movement of the XR device, among other things. The XR device can intelligently track ROIs and predict the trajectory of the ROIs relative to the XR device in order to optimize camera capture and streaming of ROIs, and reduce resource consumption and processing complexity at the XR device.

In some examples, the XR device can track an ROI and adjust a power state of image sensors and/or an associated processing mode depending on the ROI being outside or within a FOV of the image sensors. For example, the XR device can track an ROI and reduce a power state or power mode (e.g., turn off, implement a lower power/processing mode, etc.) of any image sensors lacking a visibility to the ROI (e.g., because the ROI is outside of a FOV of those image sensors). For instance, image sensors can be initialized in a first lower-power state or mode that is associated with a first lower power consumption. As described in more detail below, the first lower-power state or mode can be associated with a lower-power camera processing path. The first lower power consumption can be lower than a power consumption of a higher-power mode supported by the image sensors. The XR device can decrease the first lower-power mode of one or more image sensors of the image sensors to power off the one or more image sensors (e.g., transition the one or more image sensors to a power-off mode where the power of the image sensors is turned off) or to transition the one or more image sensors to a second lower-power mode that is associated with a second lower power consumption. The second lower power consumption is lower than the first lower power consumption of the first lower-power mode. In some examples, the second lower-power mode can include a sleep mode, a hibernation mode, a lower resolution mode, a lower framerate mode, a lower resource consumption mode, a mode that uses a processing path (e.g., a camera pipeline) that uses less resources (e.g., power, compute, etc.) than another processing path associated with the first lower-power mode in which the plurality of image sensors are initialized and/or a higher-power mode The XR device can maintain or increase a power state (e.g., turn on, implement a higher power/processing mode, etc.) of any other image sensors having a visibility to the ROA (e.g., because the ROI is within the FOV of those image sensors), and use those image sensors to capture images of the ROI. The XR device can use the images of the ROI to detect the ROI, track the ROI, and/or process (e.g., stabilize, output, etc.) images of the ROI. If the relative position of the ROI and the image sensors on the XR device changes (e.g., because of movement of the XR device and/or the ROI) and the ROI becomes within the FOV of a different image sensor, the XR device can switch to the different image sensor. For example, the XR device can adjust or maintain a power state of the different image sensor (e.g., enable or turn on, implement a higher power/processing mode, etc.) and reduce a power state of other image sensors. The intelligent adjustment of power states based on the relative position of the ROI and the FOV of image sensors on the XR device can reduce a power consumption at the XR device as well as an operational complexity (e.g., compute complexity, etc.) and a resource use (e.g., memory utilization, processor utilization, etc.) at the XR device.

In some examples, the XR device can reduce the number of image sensors used to capture an image of an ROI at any given time based on the relative position of the ROI and the FOV of image sensors on the XR device. The XR device can also reduce the number of images (or frames) captured and used to detect and/or track the ROI. The reduced number of image sensors used to capture an image of an ROI at a given time and/or the reduced number of images captured for an ROI can also reduce power consumption at the XR device, tracking latency (e.g., via a seamless handover between image sensors and/or reduction in processed images), a processing bandwidth (e.g., by processing less images), etc. In some cases, the XR device can limit the number of images processed at a given time for a target ROI to a single image. For example, rather than using all image sensors of the XR device to capture an image and process all images to detect and/or track the ROI, the XR device may only capture a full or partial image for the ROI using an image sensor with visibility to the ROI (e.g., because the ROI is within a FOV of the image sensor).

In some examples, the XR device can implement an ROI detector configured to determine a presence of an ROI. The ROI detector can determine a location of the ROI, one or more bounds of the ROI, and/or other characteristics of an ROI in an input region-of-capture (ROC). The ROC can include a two-dimensional (2D) or three-dimensional (3D) volume that is within a FOV of one or more image sensors of the XR device (e.g., a 2D or 3D volume that can be recorded/imaged by the XR device). In some examples, the overall capturable region (e.g., the overall region that can be captured by the XR device) can include the FOVs of all the image sensors at the XR device, and an image sensor's ROC can include the capture region within the capturable FOV of the image sensor. The ROI and/or ROC can be dynamic, and their location and/or dimensions can change over time.

The XR device can implement an ROI tracker that tracks the location and bounds of the ROI and any other relevant dynamic characteristics of the ROI. The ROI tracker can use the information from the ROI detector as input to track the location and bounds of the ROI and any other characteristics of the ROI. A controller can manage resources defining the ROCs associated with the XR device. The controller can ensure that the XR device employs a lower or minimum number of resources to cover the target ROI(s). In some examples, the image sensors can have m number of different possible states or configurations with different power and/or performance characteristics. The controller can determine which state to implement for each image sensor in order to maximize overall efficiency and reduce power consumption.

An example state or mode can include a lower-power state (also referred to as a lower-power mode). For example, in the first or second lower-power mode or state noted previously, an image sensor can implement a lower-power camera processing path. The lower-power state and lower-power camera processing path can include optimizations such as, for example and without limitation, implementing a lower framerate, implementing a lower resolution, implementing a lower image sensor power mode, using lower-power memory such as static random-access memory (SRAM) rather than higher power memory such as dynamic random-access memory (DRAM), using on-chip memory as opposed to off-chip or system memory, using island voltage rails to reduce leakage, using ring oscillators for clocks instead of phase-locked loops (PLLs), and/or any other optimizations. In some examples, the XR device can implement a lower-power camera processing path for an image sensor in parallel to a higher-power camera processing path. In some examples, the higher-power camera processing path can implement higher-power memory (e.g., DRAM), off-chip memory, PLLs, a higher power image sensor power mode (e.g., a higher framerate, a higher resolution, etc.), and/or other higher power/performance modes and/or operations.

The XR device can implement an ROI stabilizer that monitors the ROI tracker and provides feedback to the controller to ensure a sufficient ROC is implemented to capture the ROI. In some examples, the ROI stabilizer can perform image stabilization based on one or more image stabilization techniques such as, for example, a feature-matching-based video stabilization technique. In some cases, the ROI stabilizer can determine stabilization information (e.g., motion compensation information to compensate for motion of the imaging device), and provide feedback to the controller relating to the motion and/or motion compensation information.

In some examples, before a target ROI is detected, the XR device can begin with all (or a subset) of the image sensors of the XR device in a lower-power state or mode (e.g., the first lower-power mode described above) and/or can initially process all (or a subset of) image sensor feeds using a lower-power camera processing path. An ROI detector can process each image from the image sensors to detect the ROI. The ROI detector can perform image processing and/or object detection to detect the ROI. In some cases, the ROI detector can initially operate in a lower power and/or power-efficient mode. Once the ROI detector detects the ROI, the ROI detector can trigger the controller. The controller can initiate a higher-power state and/or camera pipeline for one or more image sensors, which can depend on the ROI detection results (e.g., the relative location of the ROI and image sensors on the XR device). The controller can maintain any other image sensor on the XR device in a lower-power state (or mode) and/or lower-power camera processing path, or in the second lower-power state (or mode), such as a disabled or a powered off state.

The controller can initiate the ROI tracker to track the ROI using one or more image sensors. The controller can also initialize the ROI stabilizer. In some examples, the controller can determine the trajectory of the ROI within the capturable FOVs of the one or more image sensors, and use this information to determine how many full or partial images (e.g., ROCs) to process for better tracking and/or ROI stabilization quality. In some cases, the controller can select certain power saving techniques for any sensors (e.g., image sensors, inertial sensors, etc.) under its control based on the properties of the sensors, the ROI(s), information from the ROI trackers, information from the ROI detectors, and/or any other information. In some cases, if the ROI is/goes outside of the overall FOV region of all the image sensors of the XR device, the controller can reset the image sensors to an initial setup mode, such as a lower-power state/mode.

In some examples, the XR device can determine, from the center of the FOV of any image sensor, the relative location of the centers of the FOVs of all the other image sensors. Each of the image sensors of the XR device can cover a limited FOV, while in combination the image sensors can cover a larger FOV. For example, the FOV centers from a reference point on a 2D image plane be represented as follows: $\vec{c}_1, \vec{c}_2, \ldots, \vec{c}_N$. Some or all of the image sensors can be different and/or can have different capabilities, FOV configurations, etc. However, for simplicity and explanation purposes, image sensors in the following discussion are assumed to be identical. In some examples, based on the capabilities of the processing unit and one or more requirements, k out of N frames can be processed where $k \in \{1, N\}$.

In some cases, the processing can include an initialization, an ROI detection, and an ROI tracking. In some examples, initially, all or a subset of image sensors can run in a lower-power state/mode, as previously described. In some cases, i image sensors can be pre-selected as defaults for processing feeds. The ROI detector can run in the background until the target ROI is detected with the FOVs of the k cameras. In some examples, when the ROI stabilizer is in effect, the number of image sensor feeds being processed can be reduced and, in some cases, can be as low as 1 (e.g., when the ROI(s) is within the FOV of a single image sensor).

In some cases, any overlapping area between each pair of FOVs of image sensors can be pre-determined. In an example, the overlap for any two pairs of image sensors with centers at $c_i$ and $c_j$ can be a shape, such as a box $bbox_{ij} = FOV_i \cap FOV_j = [x_1, y_1, x_2, y_2]_{ij}$. The box shape in this example is provided for simplicity and illustration purposes, but other examples can include other shapes/geometries.

Once the ROI is detected in the initial or default feed, the ROI tracker can track the ROI. In some cases, the ROI detector and the ROI tracker can be used in combination for tracking the ROI.

When the ROI enters an overlap region (e.g., a region within multiple FOVs), the portion of the ROI bounding box $bbox_{ROI}$ that entered the overlap region $bbox_{ij}$ can be calculated as follows:

$$Olap_{ij}^{ROI} = \frac{bbox_{ij} \cap bbox_{ROI}}{bbox_{ROI}}$$

The direction and/or velocity of movement can be used to determine which image sensor feed to use/enable and/or trigger any switches between image sensors used to capture the ROI. In some examples, if the overlap region $Olap_{ij}^{ROI}$ is over a threshold $\gamma_{ij}$, the ROI tracker can check if the ROI is moving towards $c_j$. In some cases, for a system with an overlap region sufficiently larger than the ROI, $\gamma_{ij}$ can be set to 1. From the last m frames, the aggregated trajectory of each ROI $\vec{v}_m$ (where, m=1, 2, ... r) can be determined along with the velocity of movement. If the vector towards $c_j$ from the current ROI center is $\vec{d_j}$, the ROI tracker can find the angle $\theta_j^m$ between $\vec{v_m}$ and $\vec{d_j}$ for all j=1, 2, . . . , N, using the following equation:

$$\theta_j^m = \cos^{-1}\left(\frac{\vec{v_m} \cdot \vec{d_j}}{|\vec{v_m}||\vec{d_j}|}\right)$$

If $|\theta_j^m|$ is less than a threshold $\alpha_j$, the controller may prompt a switch from a current image sensor to the image sensor with an FOV center at $c_j$ for which the angle $|\theta_j^m|$ between the velocity vector $\vec{v_m}$ and the distance vector $\vec{d_j}$ is smallest. In some cases, if there are more than one image sensor in the vicinity for which the conditions are satisfied, the image sensor for which $|\theta_j^m|$ is smaller can be chosen. In some cases, if the $|\theta_j^m|$ values are the same, the image sensor that can cover a larger FOV may be chosen.

In some cases, to prevent frequent image sensor switching, the ROI tracker can impose one or more additional conditions for triggering a switch. For example, the ROI tracker can impose a condition on the magnitude of the velocity vector, such as $|\vec{v_m}| > \beta_{ij}$. In some examples, for smaller bbox$_{ij}$ areas, the value of $\beta_{ij}$ can be smaller than the value for larger box areas.

In some cases, if two image sensors have FOVs which are not overlapping, the ROI tracker can determine whether to switch image sensors based on the velocity vector $|\vec{v_m}|$ and the angle $|\theta_j^m|$ between the velocity vector and a distance vector from an image sensor i to an image sensor j. Given the location of the ROI and the velocity vector at time t, the controller can extrapolate the ROI's location at time t+1. If the ROI's location moves outside of the FOV of the current image sensor, the controller can switch to the other image sensor along that direction.

In some cases, the XR device can also implement/fuse sensor data from one or more inertial measurement units (IMUS). For example, rapid XR device movements (e.g., caused by rapid head movements by a user wearing the XR device or any other movements) and/or rapid ROI movement can sometimes place the ROI in the FOV of a different image sensor without the XR device detecting the ROI entering the FOV of the different image sensor. In some examples, the XR device can use a combination of ROI motion trajectory information and IMU sensor data describing movement of the XR device for use in the tracking and/or stabilizing of the ROI.

In some cases, the XR device can process a partial image (e.g., less than the entire image captured) corresponding to a partial FOV (e.g., less than the entire FOV of an image sensor). For example, an image sensor can support ROIs where only the pixels for ROIs can be transferred, thereby lowering the overall bandwidth and power to capture the desired pixels. In some cases, the ROC of an image sensor may be only partially processed in order to get a stable ROI stream. The partial ROC for processing may be determined by the controller 124 based on, for example, the ROI detection, the ROI tracking, stabilization requirements, etc. In some examples, processing reduced number of pixels can result in reduced post processing of the camera stream, which can reduce resource usage and power.

In some cases, a reinforcement learning (RL) agent can be trained to help the controller determine which image sensors to operate and/or what settings to implement for one or more image sensors. The training inputs can include location information of timestamps (t-1, t-2, . . . , t-m) for each ROI. For the training, the inputs to the RL agent can include the last m ROI bbox information and the number of image sensors. Sequences of moving ROI bounding boxes of different sizes can be generated (e.g., randomly or otherwise). The RL agent can be rewarded if it is able to switch image sensors correctly so the ROI is within the FOV of the image sensor(s) that is enabled while reducing the number of enabled image sensors. Additional rewards can be used if the RL agent can minimize image sensor switches. In some cases, the reward can be inversely proportional to the number of image sensor switches. The RL agent can be penalized if the ROI is outside of the FOV of the image sensors that are currently enabled but within the FOV of one or more of the other image sensors of the XR device.

In some examples, for N image sensors and k ROIs, the actions for the RL agent can produce N binary decisions, one for each image sensor, indicating whether an image sensor feed should be processed or not. The training can be simulated in a virtual environment with an additional input (s) to the RL agent so that it can be deployed without additional training for any setup. Additional inputs can include, for example and without limitation, IMU sensor data, an indication of a number of image sensors, camera intrinsic parameters, camera extrinsic parameters, metadata, and/or any other data. In some cases, for rapid movement (electronic device movement, ROI movement, etc.) and/or varying number of image sensors and parameters, the RL agent can be enabled to learn the mathematical rationale behind switching to another image sensor. Once trained for a fixed image sensor setup, the RL agent can prompt an image sensor switch given the last m ROI bounding box information, IMU sensor information, image sensor information, and/or any other information. In some examples, the RL-based tracker may propose a region of partial sensor information (e.g., less than all the sensor information) for each selected image sensor to reduce processing time and power further.

The systems and techniques described herein can be implemented for a variety of electronic devices to intelligently capture a ROI using an image sensor that has a view (or is estimated to have a view within a threshold period of time) of the camera sensor and intelligently powering up/down other camera sensors and/or other components such as software and/or hardware components of a higher-power camera pipeline. For example, the systems and techniques described herein can be implement for mobile computing devices (e.g., smart phones, tablets, laptops, cameras, etc.), smart wearable devices (e.g., smart watches, etc.), XR devices (e.g., head-mounted displays, smart glasses, etc.), connected devices or Internet-of-Things (IoT) devices (e.g., smart televisions, smart security cameras, smart appliances, etc.), autonomous robotic devices, autonomous driving systems, and/or any other device with camera hardware.

Various aspects of the application will be described with respect to the figures.

FIG. 1 is a diagram illustrating an example of an electronic device 100 that can implement the systems and techniques described herein. In some examples, the electronic device 100 can include an electronic device configured to provide one or more functionalities such as, for example, imaging functionalities, extended reality (XR) functionalities (e.g., localization/tracking, detection, classification, mapping, content rendering, etc.), video functionalities, image processing functionalities, device management and/or control functionalities, gaming functionalities, autonomous driving or navigation functionalities, computer vision functionalities, robotic functions, automation, machine learning, electronic communication functionalities (e.g., audio/video calling, electronic messaging, etc.), web browsing functionalities, etc.

For example, in some cases, the electronic device 100 can be an XR device (e.g., a head-mounted display, a heads-up display device, smart glasses, etc.) configured to provide XR functionalities, and implement the systems and techniques described herein. In some cases, the electronic device 100 can implement one or more applications such as, for example and without limitation, an XR application, a camera application, an application for managing and/or controlling components and/or operations of the electronic device 100, a smart home application, a video game application, a device control application, an autonomous driving application, a navigation application, a productivity application, a social media application, a communications application, a modeling application, a media application, an electronic commerce application, a browser application, a design application, a map application, and/or any other application. As another example, the electronic device 100 can be a smart phone configured to implement the systems and techniques described herein.

In the illustrative example shown in FIG. 1, the electronic device 100 can include one or more image sensors, such as image sensors 102A, 102B, 102C, and 102N (collectively "image sensors 102" hereinafter); an audio sensor 104 (e.g., an ultrasonic sensor, a microphone, etc.), an inertial measurement unit (IMU) 106, and one or more compute components 110. In some cases, the electronic device 100 can optionally include one or more other/additional sensors such as, for example and without limitation, a radar, a light detection and ranging (LIDAR) sensor, a touch sensor, a pressure sensor (e.g., a barometric air pressure sensor and/or any other pressure sensor), a gyroscope, an accelerometer, a magnetometer, and/or any other sensor. In some examples, the electronic device 100 can include additional components such as, for example, a light-emitting diode (LED) device, a storage device, a cache, a GNSS/GPS receiver, a communications interface, a display, a memory device, etc. An example architecture and example hardware components that can be implemented by the electronic device 100 are further described below with respect to FIG. 10.

The electronic device 100 can be part of, or implemented by, a single computing device or multiple computing devices. In some examples, the electronic device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s).

In some implementations, the image sensors 102, the audio sensor 104, the IMU 106, and/or the one or more compute components 110 can be part of the same computing device. For example, in some cases, the image sensors 102, the audio sensor 104, the IMU 106, and/or the one or more compute components 110 can be integrated with or into a camera system, a smartphone, a laptop, a tablet computer, a smart wearable device, an XR device such as an HMD, an IoT device, a gaming system, and/or any other computing device. In other implementations, the image sensors 102, the audio sensor 104, the IMU 106, and/or the one or more compute components 110 can be part of, or implemented by, two or more separate computing devices.

The one or more compute components 110 of the electronic device 100 can include, for example and without limitation, a central processing unit (CPU) 112, a graphics processing unit (GPU) 114, a digital signal processor (DSP) 116, and/or an image signal processor (ISP) 118. In some examples, the electronic device 100 can include other processors such as, for example, a computer vision (CV) processor, a neural network processor (NNP), an application-specific integrated circuit (ASIC), a field-programmable gate array (FPGA), etc. The electronic device 100 can use the one or more compute components 110 to perform various computing operations such as, for example, extended reality operations (e.g., tracking, localization, object detection, classification, pose estimation, mapping, content anchoring, content rendering, etc.), device control operations, image/video processing, graphics rendering, machine learning, data processing, modeling, calculations, computer vision, messaging, and/or any other operations.

In some cases, the one or more compute components 110 can include other electronic circuits or hardware, computer software, firmware, or any combination thereof, to perform any of the various operations described herein. In some examples, the one or more compute components 110 can include more or less compute components than those shown in FIG. 1. Moreover, the CPU 112, the GPU 114, the DSP 116, and the ISP 118 are merely illustrative examples of compute components provided for explanation purposes.

The image sensors 102 can include any image and/or video sensor or capturing device, such as a digital camera sensor, a video camera sensor, a smartphone camera sensor, an image/video capture device on an electronic apparatus such as a television or computer, a camera, etc. In some cases, the image sensors 102 can be part of a camera or computing device such as a digital camera, a video camera, an IP camera, a smartphone, a smart television, a game system, etc. In some cases, the image sensors 102 can include multiple image sensors, such as rear and front sensor devices, and can be part of a dual-camera or other multi-camera assembly (e.g., including two camera, three cameras, four cameras, or other number of cameras).

In some examples, one or more of the image sensors 102 can include or can be part of a lower-power camera or "always on" camera, and one or more of the image sensors 102 can include or can be part of a higher-power or "main" camera. In some examples, the lower-power camera can implement a lower-power camera pipeline. The lower-power camera pipeline can include lower-power and/or more energy efficient (e.g., lower-power and/or more energy efficient than the higher-power camera and/or an associated higher-power camera pipeline) hardware and/or image/data processing software to capture image data, detect events, process captured image data, etc. In some cases, the lower-power camera can implement lower power settings and/or modes than the higher-power camera (e.g., image sensor 102A, image sensor 102B, image sensor 102C, image sensor 102N) such as, for example, a lower framerate, a lower resolution, a smaller number of image sensors, a lower-power mode, a lower-power camera pipeline (including software and/or hardware), etc. In some examples, the lower-power camera can implement less and/or lower-power image sensors than a higher-power camera, can use lower-power memory such as on-chip static random-access memory (SRAM) rather than dynamic random-access memory (DRAM), can use island voltage rails to reduce leakage, can use ring oscillators as clock sources rather than phased-locked loops (PLLs), and/or other lower-power processing hardware/components. In some examples, the lower-power camera may not handle higher-power and/or complexity sensor technologies (e.g., phase detection autofocus, dual photodiode (2PD) pixels, red-green-blue-clear (RGBC) color sensing, etc.) and/or data (e.g., mono/luma data rather than full color image data).

In some cases, the lower-power camera can remain on or "wake up" to watch movement and/or events in a scene and/or detect events in the scene while using less battery power than other devices such as higher power/resolution cameras. For example, a lower-power camera can persistently watch or wake up to watch movement and/or activity in a scene to discover objects in the scene. In some cases, upon discovering an event, the lower-power camera can trigger one or more actions such as, for example, object detection, object recognition, facial authentication, image processing tasks, among other actions. In some cases, the low-power cameras can also "wake up" other devices such as other sensors, processing hardware, etc.

In some cases, one or more of the image sensors 102 can include or be part of a higher-power camera but can run in a higher-power mode or a lower-power mode. In some examples, a higher-power camera can implement a higher-power camera pipeline and/or higher-power camera settings (e.g., higher framerate, higher resolution, etc.). The higher-power camera can run in a higher-power mode (e.g., higher-power camera settings, higher-power camera pipeline, etc.) at certain times. In some cases, the higher-power camera can also run in a lower-power mode (e.g., lower-power camera settings, lower-power camera pipeline, etc.) at other times.

In some examples, each of the image sensors 102 can capture image data and generate frames based on the image data and/or provide the image data or frames to the one or more compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the one or more compute components 110 can perform image/video processing, camera stabilization, XR processing, device management/control, power saving operations/settings, and/or other operations as described herein using data from the image sensors 102, the audio sensor 104, the IMU 106, and/or any other sensors and/or component. For example, in some cases, the one or more compute components 110 can perform camera stabilization, device control/management, tracking, localization, object detection, object classification, pose estimation, shape estimation, scene mapping, content anchoring, content rendering, image processing, modeling, content generation, gesture detection, gesture recognition, and/or other operations based on data from the image sensors 102, the audio sensor 104, the IMU 106, and/or any other component.

In some examples, the one or more compute components 110 can implement one or more software engines and/or algorithms such as, for example, a detector 120, a tracker 122, a controller 124, and/or a stabilizer 126 as described herein. In some cases, the one or more compute components 110 can implement one or more additional components and/or algorithms such as a machine learning model(s), a computer vision algorithm(s), a neural network(s), and/or any other algorithm and/or component. For example, in some cases, the detector 120, the tracker 122, the controller 124, and/or the stabilizer 126 implemented by the one or more compute components 110 can implement a machine learning engine.

In some examples, the detector 120 can be configured to determine a presence of a region of interest (ROI) to be captured by one or more of the image sensors 102. The detector 120 can determine a location of the ROI, one or more bounds of the ROI, and/or other characteristics of an ROI in an input region-of-capture (ROC). The ROC can include a two-dimensional (2D) or three-dimensional (3D) volume that is within a FOV of one or more of the image sensors 102 (e.g., a 2D or 3D volume that can be recorded/imaged by the electronic device 100). In some examples, the overall capturable region (e.g., the overall region that can be captured by the electronic device 100) can include the FOVs of all the image sensors 102 at the electronic device 100, and an image sensor's ROC can include the capture region within the capturable FOV of the image sensor. The ROI and/or ROC can be dynamic, and their location and/or dimensions can change over time.

In some examples, the tracker 122 can track the location and bounds of the ROI and any other relevant dynamic characteristics of the ROI. The tracker 122 can use the information from the detector 120 as input to track the location and bounds of the ROI and any other characteristics of the ROI. The controller 124 can manage resources defining the ROCs associated with the electronic device 100. The controller 124 can ensure that the electronic device 100 employs a lower or minimum number of resources to cover the target ROI(s). In some examples, the image sensors can have m number of different possible states or configurations with different power and/or performance characteristics. The controller 124 can determine which state to implement for each image sensor in order to maximize overall efficiency and reduce power consumption.

An example state can include a lower-power state. As previously explained, in the lower-power state, an image sensor can implement a lower-power camera processing path (e.g., a lower-power camera pipeline). The lower-power state and lower-power camera processing path can include optimizations such as, for example and without limitation, implementing a lower framerate, implementing a lower resolution, implementing a lower image sensor power mode, using lower-power memory such as static random-access memory (SRAM) rather than higher power memory such as dynamic random-access memory (DRAM), using on-chip memory as opposed to off-chip or system memory, using island voltage rails to reduce leakage, using ring oscillators for clocks instead of phase-locked loops (PLLs), and/or any other optimizations.

In some examples, the higher-power camera processing path (e.g., higher-power camera pipeline) can implement higher-power memory (e.g., DRAM), off-chip memory, PLLs, a higher power image sensor power mode (e.g., a higher framerate, a higher resolution, etc.), and/or other higher power/performance modes and/or operations. In some examples, the electronic device 100 can implement a lower-power camera processing path for an image sensor in parallel to a higher-power camera processing path. In some cases, the electronic device 100 can selectively implement a lower-power camera processing path or a higher-power processing path for an image sensor at different times.

In some examples, the stabilizer 126 can monitor the tracker 122 and provide feedback to the controller 124 to ensure a sufficient ROC is implemented to capture the ROI. In some examples, the stabilizer 126 can perform image stabilization based on one or more image stabilization techniques such as, for example, a feature-matching-based video stabilization technique. In some cases, the stabilizer 126 can determine stabilization information (e.g., motion compensation information to compensate for motion of the imaging device), and provide feedback to the controller 124 relating to the motion and/or motion compensation information.

In some examples, before a target ROI is detected, the electronic device 100 can begin with all (or a subset) of the image sensors 102 in a lower-power state and/or can initially process all (or a subset of) image sensor feeds using a lower-power camera processing path. The detector 120 can process each image from the image sensors 102 to detect the ROI. The detector 120 can perform image processing and/or object detection to detect the ROI. In some cases, the detector 120 can initially operate in a lower power and/or power-efficient mode. Once the detector 120 detects the ROI, the detector 120 can trigger the controller 124. The controller 124 can initiate a higher-power state and/or camera pipeline for one or more of the image sensors 102, which can depend on the ROI detection results (e.g., the relative location of the ROI and image sensors 102 on the electronic device 100). The controller 124 can maintain any other image sensor on the electronic device 100 in a lower-power state and/or lower-power camera processing path, or in a disabled or powered off state.

The controller 124 can initiate/initialize the tracker 122 to track the ROI using one or more of the image sensors 102. The controller 124 can also initialize the stabilizer 126. In some examples, the tracker 122 and/or the controller 124 can determine the trajectory of the ROI within the capturable FOVs of one or more of the image sensors 102, and use this information to determine how many full or partial images (e.g., ROCs) to process for better tracking and/or ROI stabilization quality. In some cases, the controller 124 can select certain power saving techniques for any sensors (e.g., image sensors, inertial sensors, etc.) under its control based on the properties of the sensors, the ROI(s), information from the tracker 122, information from the detector 120, and/or any other information. In some cases, if the ROI is/goes outside of the overall FOV region of all the image sensors 102, the controller 124 can reset the image sensors 102 to an initial setup mode, such as a lower-power state/ mode.

In some cases, the processing can include an initialization, an ROI detection, and/or an ROI tracking. In some examples, initially, all or a subset of the image sensors 102 can run in a lower-power state/mode, as previously described. In some cases, i image sensors can be pre-selected as defaults for processing feeds. The detector 120 can run in the background until the target ROI is detected with the FOVs of k image sensors. In some examples, when the stabilizer 126 is in effect, the number of image sensor feeds being processed can be reduced and, in some cases, can be as low as 1 (e.g., when the ROI(s) is within the FOV of a single image sensor). In some cases, any overlapping area between each pair of FOVs of image sensors can be pre-determined.

In some examples, once the ROI is detected in the initial or default feed, the tracker 122 can track the ROI. In some cases, the detector 120 and the tracker 122 can be used in combination for tracking the ROI.

In some cases, to prevent frequent image sensor switching, the tracker 122 can impose one or more conditions for triggering a switch between image sensors. For example, the tracker 122 can impose a condition on the magnitude of a velocity vector describing a velocity and trajectory of the ROI.

In some cases, if two image sensors have FOVs which are not overlapping, the tracker 122 can determine whether to switch image sensors based on the velocity vector and the angle between the velocity vector and a distance vector from an image sensor and another image sensor. Given the location of the ROI and the velocity vector $\vec{v}_m$ at time t, the controller 124 can extrapolate the ROI's location at time t+1. If the ROI's location moves outside of the FOV of the current image sensor, the controller 124 can switch to the other image sensor along that direction.

In some cases, the electronic device 100 can implement/ fuse sensor data from one or more inertial measurement units (IMUS). For example, rapid electronic device movements (e.g., caused by rapid head movements by a user wearing or handling the electronic device or any other movements) and/or rapid ROI movement can sometimes place the ROI in the FOV of a different image sensor without the electronic device 100 detecting the ROI entering the FOV of the different image sensor. In some examples, the electronic device 100 can use a combination of ROI motion trajectory information and IMU sensor data describing movement of the electronic device 100 for use in the tracking and/or stabilizing of the ROI.

In some cases, the electronic device 100 can process a partial image (e.g., less than an entire image captured) corresponding to a partial FOV (e.g., less than the entire FOV of an image sensor). For example, an image sensor can support ROIs where only the pixels for ROIs can be transferred, thereby lowering the overall bandwidth and power to capture the desired pixels. In some cases, the ROC of an image sensor may be only partially processed in order to get a stable ROI stream. The partial ROC for processing may be determined by the controller 124 based on, for example, the ROI detection, the ROI tracking, stabilization requirements, etc. In some examples, processing reduced number of pixels can result in reduced post processing of the camera stream, which can reduce resource usage and power.

In some cases, a reinforcement learning (RL) agent can be trained to help the controller 124 determine which image sensors to operate and/or what settings to implement for one or more image sensors. The training inputs can include location information of timestamps (t-1, t-2, . . . , t-m) for each ROI. For the training, the inputs to the RL agent can include the last m ROI bounding box information and the number of image sensors. Sequences of moving ROI bounding boxes of different sizes can be generated (e.g., randomly or otherwise). The RL agent can be rewarded if it is able to switch image sensors correctly so the ROI is within the FOV of the image sensor(s) that is enabled while reducing the number of enabled image sensors. Additional rewards can be used if the RL agent can minimize image sensor switches. In some cases, the reward can be inversely proportional to the number of image sensor switches. The RL agent can be penalized if the ROI is outside of the FOV of the image sensors that are currently enabled but within the FOV of one or more of the other image sensors of the electronic device 100.

In some cases, for N image sensors and k ROIs, the actions for the RL agent can produce N binary decisions, one for each image sensor, indicating whether an image sensor feed should be processed or not. The training can be simulated in a virtual environment with an additional input (s) to the RL agent so that it can be deployed without additional training for any setup. Additional inputs can include, for example and without limitation, IMU sensor data, information about the number of image sensors, camera intrinsic parameters, camera extrinsic parameters, metadata, and/or any other data. In some cases, for rapid movement (electronic device movement, ROI movement, etc.) and/or varying number of image sensors and parameters, the RL agent can be enabled to learn the mathematical rationale behind switching to another image sensor. Once trained for a fixed image sensor setup, the RL agent can prompt an image sensor switch given the last m ROI bbox information, IMU sensor information, image sensor information, and/or any other information. In some examples, the RL-based tracker may also propose a region of partial sensor information (e.g., less than all the sensor information) for each selected image sensor to reduce processing time and power further.

The components shown in FIG. 1 with respect to the electronic device 100 are illustrative examples provided for explanation purposes. In other examples, the electronic device 100 can include more or less components than those shown in FIG. 1. While the electronic device 100 is shown to include certain components, one of ordinary skill will appreciate that the electronic device 100 can include more or fewer components than those shown in FIG. 1. For example, the electronic device 100 can include, in some instances, one or more memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and/or hardware components that can be implemented with the electronic device 100 are described below with respect to FIG. 10.

Figure 2:
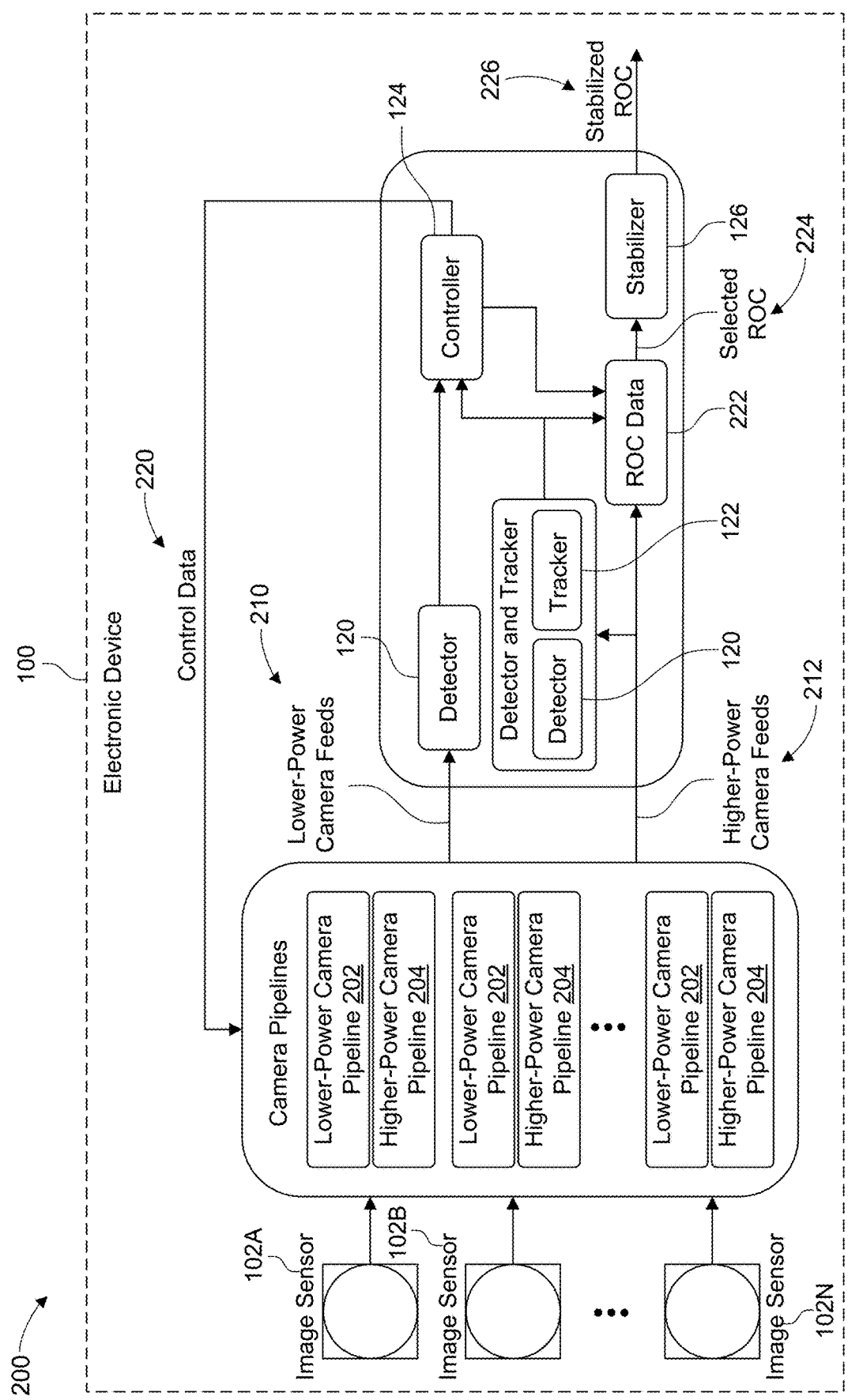
FIG. 2 is a diagram illustrating an example system process for efficiently imaging ROIs with lower compute and power costs, in accordance with some examples of the present disclosure.

FIG. 2 is a diagram illustrating an example system process 200 for efficiently imaging ROIs with lower compute and power costs. In this examples, the image sensors 102 can capture an image and process the image through the lower-power camera pipeline 202 or the higher-power camera pipeline 204. The image sensors 102 can attempt to capture a ROI in the images captured by the image sensors 102. In some cases, one or more image sensors may not be able to capture the ROI if the one or more image sensors do not have a view to the ROI (e.g., if the ROI is not within the FOV of the one or more image sensors or if the ROI is within the FOV of the one or more image sensors but the ROI is occluded by an object). In some cases, the electronic device 100 may process images from all of the image sensors 102 initially even if one or more image sensors do not have a view of the ROI and are unable to capture an image of the ROI. In other cases, the electronic device 100 may only process images from a subset of the image sensors 102, such as a subset of image sensors estimated to have a view of the ROI and/or a subset of image sensors that have lower-power modes/capabilities.

In some cases, the images from the image sensors 102 can be initially processed by the lower-power camera pipeline 202. In some examples, once the electronic device 100 determines which image sensors have a view of the ROI, the image data from those image sensors may be processed by the higher-power camera pipeline 204. The higher-power camera pipeline 204 can provide additional and/or more robust processing capabilities, imaging effects, outputs, etc., and/or higher quality image outputs (e.g., higher resolutions, higher framerates, etc.).

The lower-power camera pipeline 202 can represent a single lower-power camera pipeline or multiple lower-power camera pipelines. For example, in some cases, the lower-power camera pipeline 202 can process image data from any of the image sensors 102. Here, the lower-power camera pipeline 202 can be shared by multiple image sensors. In other cases, the lower-power camera pipeline 202 can represent multiple lower-camera pipelines. In some examples, the multiple lower-camera pipelines can be used by different image sensors. For example, each lower-power camera pipeline can serve as the camera processing path for one or more designated image sensors. As another example, the multiple lower-power camera pipelines can serve as separate camera processing paths for the image sensors 102 and each lower-power camera pipeline can serve a designated image sensor(s) or can serve any of the image sensors 102.

As previously mentioned, in some cases, the image sensors 102 may initially process their captured images through the lower-power camera pipeline 202. In some examples, the lower-power camera pipeline 202 can include pre-processing (e.g., image resizing, denoising, segmentation, smoothing edges, color correction/conversion, debayering, scaling, gamma correction, etc.) operations. In some cases, the lower-power camera pipeline 202 can include one or more image post-processing operations. In some examples, the lower-power camera pipeline 202 can invoke/include lower-power hardware, settings, and/or processing such as, for example, lower/reduced resolution, lower/reduced framerate, a lower-power sensor, on-chip SRAM (e.g., rather than DRAM), island voltage rails, ring oscillators for clock sources (e.g., rather than PLLs), a lower/reduced number of image sensors, etc.

The lower-power camera pipeline 202 can process the image data from the image sensors 102 and output lower-power camera feeds 210 based on image data from each of the image sensors 102. Each lower-power camera feed 210 can include processed image data generated by the lower-power camera pipeline 202 based on an image captured by an image sensor. The lower-power camera pipeline 202 can send the lower-power camera feeds 210 to the detector 120.

The detector 120 can process the lower-power camera feeds 210 to detect the ROI in any images from the image sensors 102. In some examples, the detector 120 can determine a presence of an ROI captured by one or more images from one or more of the image sensors 102. The detector 120 can perform image processing and/or object detection to detect the ROI. In some cases, the detector 120 can implement a machine learning algorithm and/or a neural network to detect the ROI in the lower-power camera feed 210.

In some examples, the detector 120 can determine a location of the ROI, one or more bounds of the ROI, and/or other characteristics of an ROI in an input region-of-capture (ROC). The ROC can include a two-dimensional (2D) or three-dimensional (3D) volume that is within a FOV of one or more of the image sensors 102 (e.g., a 2D or 3D volume that can be recorded/imaged by the image sensors). In some examples, the overall capturable region (e.g., the overall region that can be captured by the image sensors 102) can include the FOVs of all the image sensors 102 at the electronic device 100, and an image sensor's ROC can include the capture region within the capturable FOV of the image sensor.

Once the detector 120 detects the ROI in one or more of the lower-power camera feeds 210, the detector 120 can trigger the controller 124. For example, the detector 120 can trigger the controller 124 to select which image sensor(s) to use to capture the ROI and/or to determine what power modes/states to set/configure each of the image sensors 102. In some examples, the controller 124 can initiate a higher-power state and/or camera pipeline for one or more of the image sensors 102, which can depend on the ROI detection results (e.g., the relative location of the ROI and image sensors 102 on the electronic device 100). The controller 124 can maintain any other image sensor on the electronic device 100 in a lower-power state and/or lower-power camera processing path, or in a disabled or powered off state.

For example, the controller 124 can generate control data 220 to control an operation/state/mode of the lower-power camera pipeline, the higher-power camera pipeline 204, and/or any of the image sensors 102. In some cases, the control data 220 can include instructions to control (e.g., increase, etc.) a power mode of an image sensor associated with a lower-power camera feed in which the ROI was detected and/or switch the processing path for image data from that image sensor from the lower-power camera pipeline 202 to the higher-power camera pipeline 204. In some cases, the instructions in the control data 220 can include instructions to control (e.g., decrease, etc.) a power mode of any image sensors associated with any lower-power camera feeds in which the ROI was not detected. To illustrate, the control data 220 can include instructions to increase a power mode of an image sensor associated with a lower-power camera feed in which the ROI was detected and switch the processing path for image data from that image sensor from the lower-power camera pipeline 202 to the higher-power camera pipeline 204, as well as instructions to decrease a power mode (or turn off) of any image sensors associated with any lower-power camera feeds in which the ROI was not detected.

In some cases, the controller 124 can add detection results to ROC data 222 used to determine an ROC to be processed (e.g., stabilized, output, etc.). For example, the controller 124 can add to the ROC data 222 an indication of the ROC of an image sensor(s) based on the detection results from the detector 120.

As previously explained, the control data 220 can trigger any of the image sensors 102 to run in a higher-power mode (e.g., higher framerate, higher resolution, etc.) and/or use the higher-power camera pipeline 204 to process images from those image sensors. For example, if the detector 120 determines that the lower-power camera feed associated with image sensor 102A captured the ROI, the control data 220 can include an instruction to trigger the image sensor 102A to run in a higher-power mode and/or use the higher-power camera pipeline 204 to process images from the image sensor 102A. In this example, the image sensor 102A (and any other image sensors set to use the higher-power camera pipeline 204) can send captured image data to the higher-power camera pipeline 204 for processing.

The higher-power camera pipeline 204 can include one or more operations and/or hardware used to capture images/video and/or process captured images/video. In some cases, the higher-power camera pipeline 204 can be the same as or include the lower-power camera pipeline 202 with one or more adjusted settings for producing a higher image quality, producing additional and/or more complex image effects, and/or achieving a higher processing/output performance. For example, in some cases, the higher-power camera pipeline 204 can include the lower-power camera pipeline 202 with one or more settings increasing an image resolution, increasing a framerate, utilizing full color image data (e.g., as opposed to only mono/luma data), etc. In other cases, the higher-power camera pipeline 204 can include one or more different image sensors, settings, operations, and/or hardware blocks than the lower-power camera pipeline 202.

In some examples, the higher-power camera pipeline 204 includes one or more image pre-processing operations, one or more post-processing operations, and/or any other image processing operations. For example, the higher-power camera pipeline 204 can include image resizing, denoising, segmentation, smoothing edges, color correction/conversion, debayering, scaling, gamma correction, tone mapping, color sensing, sharpening, compression, demosaicing, noise reduction (e.g., chroma noise reduction, luma noise reduction, temporal noise reduction, etc.), feature extraction, feature recognition, computer vision, auto exposure, auto white balance, auto focus, depth sensing, image stabilization, sensor fusion, HDR, and/or any other operations. In some examples, the higher-power camera pipeline 204 can invoke/include higher-power hardware, settings, and/or processing such as, for example, higher/increased resolution, higher/increased framerate, higher-power image sensor, DRAM use/allocation, PLLs for clock sources, a higher/increased number of image sensors, etc.

In the previous example, after processing the image from the image sensor 102A (and any other image sensors set to use the higher-power camera pipeline 204), the higher-power camera pipeline 204 can output a higher-power camera feed 212 including processed image data generated based on the image from the image sensor 102A (and an image(s) from any other image sensors set to use the higher-power camera pipeline 204). The higher-power camera pipeline 204 can send the higher-power camera feed 212 to the detector 120 and the tracker 122. In some cases, the higher-power camera pipeline 204 can also add data from the higher-power camera feed 212 to the ROC data 222.

The detector 120 can receive the higher-power camera feed 212 and determine if the ROI is captured in the image data in the higher-power camera feed 212. For example, the detector 120 can determine that the higher-power camera feed 212 includes the ROI. The tracker 122 can then track the location and bounds of the ROI and any other relevant dynamic characteristics of the ROI. The tracker 122 can use the information from the detector 120 as input to track the location and bounds of the ROI and any other characteristics of the ROI. The tracker 122 can provide tracking information (e.g., tracking results, etc.) to the controller 124. In some examples, tracker 122 can also add some or all of the tracking information to the ROC data 222.

The controller 124 can use the tracking information to generate the control data 220. In some cases, the controller 124 can also use detection information from the detector 120 to generate the control data 220. In some examples, the controller 124 can use the detection information and/or the tracking information to select which image sensor(s) to use to capture the ROI and/or to determine what power modes/states to set/configure each of the image sensors 102.

The control data 220 can include instructions/commands to control a power mode of one or more resources (e.g., one or more of the image sensors 102, one or more resources associated with the lower-power camera pipeline 202 and/or the higher-power camera pipeline 204), the camera pipeline (e.g., the lower-power camera pipeline 202, the higher-power camera pipeline 204) used by any of the image sensors 102, etc. In some cases, the controller 124 can adjust to or maintain in a higher-power state/mode any image sensor (e.g., image sensor 102A in the previous example) that captured an image in which the ROI was detected. The controller 124 can also adjust to or maintain in a lower-power state/mode or a disabled and/or powered off state, any other image sensor that captured an image that did not include the ROI.

In some examples, the controller 124 can manage resources defining the ROCs associated with any image sensors that captured the ROI in an image and/or that have a FOV within a threshold distance to the ROI. The controller 124 can ensure that the electronic device 100 employs a lower or minimum number of resources to cover (e.g., capture, detect, track, process, etc.) the target ROI(s). In some examples, the image sensors 102 can have m number of different possible states or configurations with different power and/or performance characteristics. The controller 124 can determine which state to implement for each image sensor in order to maximize/increase overall efficiency and reduce/minimize power consumption.

The controller 124 can analyze the ROC data 222 and select an ROC(s) from the ROC data 222. The selected ROC 224 can include an ROC that captures the ROI. In some examples, the ROC can include an ROC selected from one or more other ROCs that also capture the ROI. For example, if there is an overlap between ROCs and the ROI is within the overlap, the controller 124 can select a particular ROC from the overlapping ROCs as further described herein. In some examples, the selected ROC 224 can include an image reflecting the selected ROC 224.

In some cases, the controller 124 can add weights to power costs determined for the image sensors 102, and use the weighted power costs to select which image sensor(s) to use to capture the ROI and/or to determine what power modes/states to set/configure each of the image sensors 102. For example, using the weighted power costs, the controller 124 can decide to use an image sensor that produces a lower quality image even though an image sensor that can produce a higher quality image and that has the ROI within its FOV (e.g., within an overlapping FOV region) to reduce a power consumption while incurring a limited or acceptable quality loss. In some cases, the controller 124 can implement a deep-learning algorithm to bridge the quality gap between the higher quality image and the lower quality image based on prior higher quality images capturing the ROI, the lower quality image, and/or motion information (e.g., determined based on captured images and/or sensor data such as inertial sensor data).

The controller 124 can send the selected ROC 224 to the stabilizer 126 for stabilization. For example, the controller 124 can send an image associated with the selected ROC 224 to the stabilizer 126 for stabilization. The stabilizer 126 can perform image stabilization on the selected ROC 224 and output a stabilized ROC 226. In some examples, the stabilizer 126 can perform image stabilization on the selected ROC 224 based on one or more image stabilization techniques such as, for example and without limitation, a feature-matching-based video stabilization technique. In some cases, the stabilizer 126 can determine stabilization information (e.g., motion compensation information to compensate for motion of the imaging device, etc.) and provide feedback to the controller 124 relating to the motion and/or motion compensation information. In some examples, the stabilizer 126 can monitor the tracker 122 and provide feedback to the controller 124 to ensure a sufficient ROC is implemented to capture the ROI.

In some cases, the tracker 122 and/or the controller 124 can determine the trajectory of the ROI within the capturable FOVs of one or more of the image sensors 102, and use this information to determine how many full or partial images (e.g., ROCs) to process for better tracking and/or ROI stabilization quality. In some cases, the controller 124 can select certain power saving techniques for any sensors (e.g., image sensors, inertial sensors, etc.) under its control based on the properties of the sensors, the ROI(s), information from the tracker 122, information from the detector 120, and/or any other information. In some cases, if the ROI is/goes outside of the overall FOV region of all the image sensors 102, the controller 124 can reset the image sensors 102 to an initial setup mode, such as a lower-power state/mode.

In some examples, when the stabilizer 126 is in effect, the number of image sensor feeds being processed can be reduced and, in some cases, can be as low as 1 (e.g., when the ROI(s) is within the FOV of a single image sensor). In some cases, any overlapping area between each pair of FOVs of image sensors can be pre-determined. In an example, the overlap for any two pairs of image sensors with centers at $c_i$ and $c_j$ can be a shape, such as a box $bbox_{ij}=FOV_i \cap FOV_j=[x_1,y_1,x_2,y_2]_{ij}$. The box shape in this example is provided for simplicity and illustration purposes, but other examples can include other shapes/geometries.

In some cases, the controller 124 can also adjust a power mode/state of the detector 120, the tracker 122, and/or the stabilizer 126. For example, the control data 220 generated by the controller 124 can include an instruction/command to set the detector 120 to run in a power-efficient manner (e.g., a lower-power mode as previously described). In some cases, initially, all the image sensors 102 or a set of pre-selected image sensors can operate in a lower-power mode with the detector 120 running in a power-efficient manner (e.g., in a lower-power mode) in the background. The controller 124 can trigger a particular image sensor and the higher-power camera pipeline 204 when an ROI is detected within a FOV of that image sensor. Even after that event, any image sensors that are still running in the lower-power mode may also run the detector 120 in the power-efficient manner (e.g., in the lower-power mode) while the tracker 122 takes over the higher-power camera pipeline 204. In the event that the tracker 122 loses the ROI (e.g., if the object moved faster than anticipated and/or for any other reason), the detector 120 running in the power-efficient manner may still capture the ROI and trigger the higher-power camera pipeline for processing image data from one or more other image sensors.

In some cases, to achieve additional power and/or bandwidth savings, the electronic device 100 can treat the camera exposures as distinct imaging events (e.g., as distinct images and/or image processing events). The electronic device 100 can coordinate individual exposures across an array of image sensors to reduce and/or minimize power consumption used to capture, detect, and/or track a given ROI. For example, in some cases, instead of the camera (e.g., image sensor 102A, image sensor 102B, image sensor 102C, image sensor 102N) on the electronic device 100 streaming image data with pre-programmed settings such as exposure time, strobe, etc., each camera frame exposure can be individually triggered at the sensor. To illustrate, unlike traditional camera video streams, each exposure can be individually controlled and commanded by the electronic device 100. In some examples, rather than the cameras of the electronic device 100 functioning as and/or providing camera streams that may be dialed back or put to sleep, each camera can also (e.g., alternatively or additionally) function as an on-demand frame provider. In some cases, the on-demand frame provisioning and/or "trigger mode" described above can provide an intelligent/adaptive way to control camera resources based on an ROI.

In some examples, treating camera exposures as distinct imaging events can also help the electronic device 100 synchronize cameras. For example, the electronic device 100 can implement a synchronization ("sync") mechanism (e.g., software and/or hardware) that can keep cameras in sync (e.g., between cameras and/or between cameras and other components such as a display device and/or any other device) with a trigger mode. The electronic device 100 can have control over the exposure of cameras to sync cameras of the electronic device 100. The electronic device 100 can maintain cameras in sync for various reasons. For example, in computer vision tracking, maintaining cameras in sync ensure that features in a frame from one camera of the electronic device 100 can be matched to features taken at the same time (or substantially the same time) by an overlapping camera (e.g., a camera having an overlapping ROI) of the electronic device 100.

In some cases, the electronic device 100 can move the intelligence/logic applied by the controller 124 to adjust settings/modes, states, etc., closer to the image sensors so the ROC can provide inputs (or can be used as inputs) used by the electronic device 100 to determine sleep and exposure patterns. In some examples, any number of inputs can be used by the electronic device 100 to determine how cameras of the electronic device 100 behave based on an ROI. For example, in some cases, the electronic device 100 can command a camera implement a power mode of the camera, such as a sleep mode, if the ROI tracker (e.g., tracker 122) has determined that the ROI has not moved for a certain amount of time. As another example, if the ROI is further away from a specific camera, the electronic device 100 can reduce the frame rate of that specific camera. As yet another example, if the ROI is moving rapidly (e.g., above a threshold), the electronic device 100 can reduce the camera exposure setting to capture the ROI without or with less motion blur.

Figure 3A:
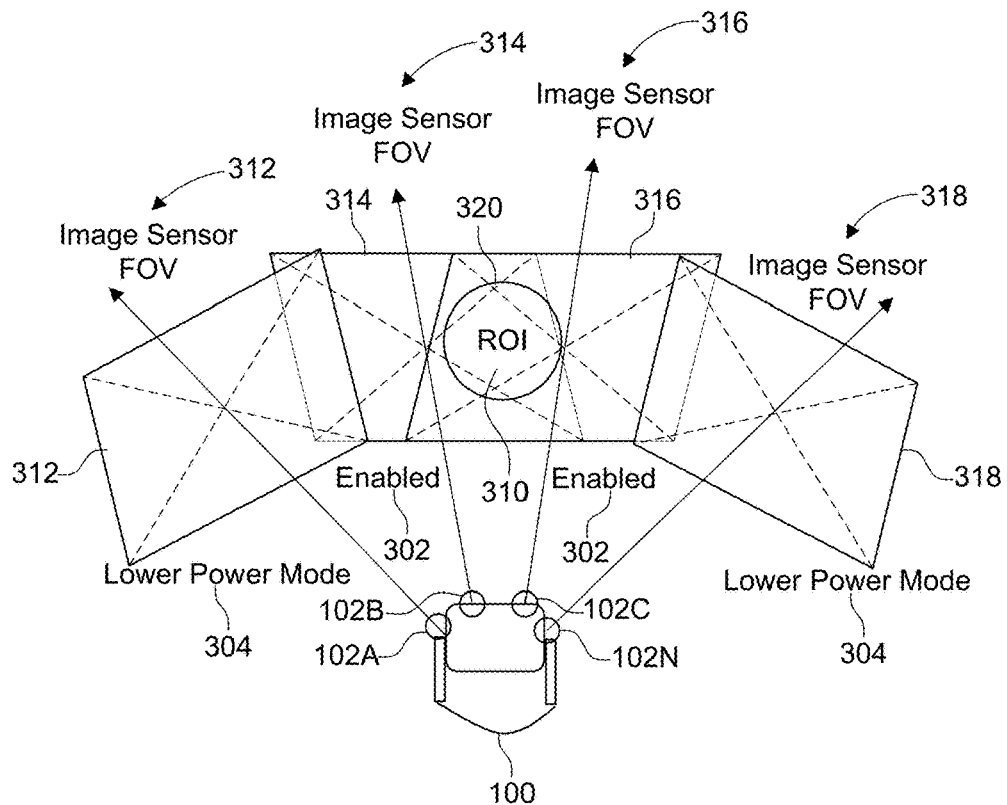
FIG. 3A is a diagram illustrating example states of image sensors on an electronic device set based on a location of a region-of-interest and the field-of-view of the image sensors, in accordance with some examples of the present disclosure.

FIG. 3A is a diagram illustrating example states of image sensors 102A, 102B, 102C, through 102N on the electronic device 100 based on a location of an ROI 310 and the FOV of the image sensors 102. In this example, the ROI 310 is within an overlapping FOV region 320 that is within the FOV 314 of the image sensor 102B and the FOV 316 of the image sensor 102C. Thus, the ROI 310 is within the FOV 314 of the image sensor 102B and the FOV 316 of the image sensor 102C. However, in this example, the ROI 310 is not within the FOV 312 of the image sensor 102A and the FOV 318 of the image sensor 102N.

As shown in FIG. 3A, the image sensors 102B and 102C are in an enabled state 302, and the image sensors 102A and 102N are in a lower-power mode 304. In some examples, the enabled state 302 can represent a state in which the image sensors 102B and 102C are powered on, initialized, and capturing (or set to capture) images of the ROI 310. In some cases, the enabled state 302 can represent a higher-power mode, as previously discussed. In other cases, the enabled state 302 can represent a lower-power mode such as a power mode that implements one or more settings, operations, hardware and/or software resources, and/or processing paths that have a lower power/resource consumption than a higher-power mode supported by the electronic device 100 and the image sensors 102B and 102C. The lower-power mode 304 can represent a powered off mode, a sleep mode, a hibernation mode, or a power mode that implements one or more settings, operations, hardware and/or software resources, and/or processing paths that have a lower power/ resource consumption than the enabled state 302.

In some examples, the electronic device 100 (e.g., via the controller 124) can set the image sensors 102B and 102C to the enabled state 302 based on a determination that the ROI 310 is within the FOV 314 of the image sensor 102B and the FOV 316 of the image sensor 102C. To conserve resources (e.g., power, compute, etc.), the electronic device 100 (e.g., via the controller 124) can set the image sensors 102A and 102N to the lower-power mode 304 based on a determination that the ROI 310 is not within the FOV 312 of the image sensor 102A and the FOV 318 of the image sensor 102N. For example, since the image sensors 102A and 102N are unable to capture an image of the ROI 310 while the ROI 310 is not within the FOV 312 of the image sensor 102A and the FOV 318 of the image sensor 102N, the electronic device 100 (e.g., via the controller 124) can set the image sensors 102A and 102N to the lower-power mode 304. The electronic device 100 can set the image sensors 102A and 102N to the lower-power mode 304 in order to reduce the amount of resources (e.g., power, compute, etc.) that are utilized by the image sensors 102A and 102N when the image sensors 102A and 102N are not able to capture images of the ROI 310 because the ROI 310 is not within the FOV 312 of the image sensor 102A and the FOV 318 of the image sensor 102N.

In some examples, if movement of the electronic device 100 and/or the ROI 310 causes a change in the image sensors that have a view of the ROI 310 (e.g., from the respective locations of the electronic device 100 and the ROI 310), the electronic device 100 (e.g., via the controller 124) can adjust the power states/modes of the image sensors 102 to ensure that one or more image sensors that have a view of the ROI 310 are in an enabled state and/or higher-power mode. The electronic device 100 can also adjust the power states/modes of the image sensors 102 to ensure that one or more image sensors that do not have a view of the ROI 310 are in a lower-power mode, a powered off state, a disabled state, a sleep state, or a state that provides power savings while those one or more image sensors do not have a view of the ROI 310.

Figure 3B:
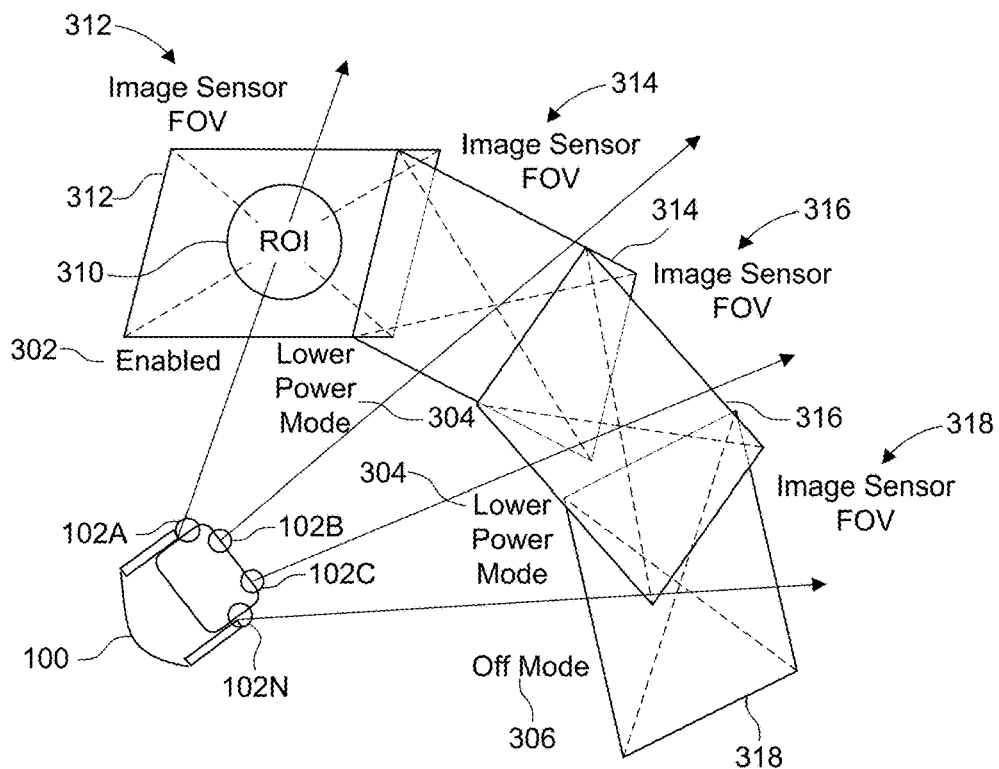
FIG. 3B is a diagram illustrating example of an adjustment of the states of image sensors on the electronic device in response to a change in the location of the region-of-interest relative to the field-of-views of the image sensors, in accordance with some examples of the present disclosure.

FIG. 3B is a diagram illustrating example of an adjustment of the states of the image sensors 102 on the electronic device 100 in response to a change in the location of the ROI 310 relative to the FOVs of the image sensors 102. In this example, the electronic device 100 an orientation of the electronic device 100 has turned a certain amount to the right (e.g., relative to a front of the electronic device 100) while the ROI 310 is being tracked and captured by the image sensors 102. The turn to the right of the electronic device 100 changed which image sensors have a view of the ROI 310. As shown in FIG. 3B, the ROI 310 is now within the FOV 312 of the image sensor 102A but is outside of the FOV 314 of the image sensor 102B, the FOV 316 of the image sensor 102C, and the FOV 318 of the image sensor 102N.

In response to the change in orientation of the electronic device 100, the electronic device 100 (e.g., via the controller 124) has changed the state of the image sensor 102A from the lower-power mode 304 shown in FIG. 3A to the enabled state 302 shown in FIG. 3B. Here, the electronic device 100 has changed the state of the image sensor 102A based on a determination that the ROI 310 is now within the FOV 312 of the image sensor 102A. In some cases, the electronic device 100 can change the state of the image sensor 102A to the enabled state 302 before the ROI 310 is within the FOV 312 of the image sensor 102A. For example, if the electronic device 100 predicts that the ROI 310 will be in the FOV 312 of the image sensor 102A within a certain period of time, the electronic device 100 can proactively change the state of the image sensor 102A to the enabled state 302 so the image sensor 102A is able to capture an image of the ROI 310 when or if the ROI 310 becomes within the FOV 312 of the image sensor 102A as predicted. The electronic device 100 can predict that the ROI 310 will be in the FOV 312 of the image sensor 102A based on a tracked location of the ROI 310 relative to the electronic device 100 and/or based on a relative trajectory of electronic device 100 and the ROI 310. As another example, the electronic device 100 can determine that the ROI 310 is within a threshold proximity to the FOV 312 of the image sensor 102A, and proactively change the state of the image sensor 102A to the enabled state 302 so the image sensor 102A is able to capture an image of the ROI 310 when or if the ROI 310 becomes within the FOV 312 of the image sensor 102A.

In the previous examples, if the relative location of the ROI 310 and the electronic device 100 later changes such that the ROI 310 becomes outside the threshold proximity to the FOV 312 of the image sensor 102A, the electronic device 100 can change the state of the image sensor 102A from the enabled state 302 to another state, such as for example, a disabled or powered off state, a sleep state, a lower-power mode state, etc. Moreover, the electronic device 100 can maintain the image sensor 102A in the enabled state 302 while the ROI 310 remains within the threshold proximity to the FOV 312 of the image sensor 102A, if the relative location of the ROI 310 and the electronic device 100 changes such that the ROI 310 becomes within the FOV 312 of the image sensor 102A, or for a predetermined period of time.

In response to the change in orientation of the electronic device 100, the electronic device 100 (e.g., via the controller 124) has also changed the state of the image sensor 102B from the enabled state 302 to the lower-power mode 304, the state of the image sensor 102C from the enabled state 302 to the lower-power mode 304, and the state of the image sensor 102N from the lower-power mode 304 to an off mode 306 (e.g., turned off and/or disabled). Here, the electronic device 100 has changed the state of the image sensors 102B, 102C, and 102N based on a determination that the ROI 310 is not within the FOV 314 of the image sensor 102A, the FOV 316 of the image sensor 102C or the FOV 318 of the image sensor 102N. In some examples, the electronic device 100 can change the state of the image sensor 102N to the off mode 306 (e.g., rather than the lower-power mode 304) based on a proximity/distance of the ROI 310 to the FOV 318 of the image sensor 102N. For example, in this illustrative example, the lower-power mode 304 can represent an off but low power state, and the off mode 306 can represent a powered off state. The ROI 310 is farther from the FOV 318 of the image sensor 102N than the FOV 314 of the image sensor 102B or the FOV 316 of the image sensor 102C. Based on the ROI 310 being farther away from the FOV 318 of the image sensor 102N, the electronic device 100 can change the state of the image sensor 102N to the off mode 306. Since the ROI 310 is closer to the FOV 314 of the image sensor 102B and the FOV 316 of the image sensor 102C, the electronic device 100 can set the image sensor 102B and the image sensor 102C to the lower-power mode 304 rather than the off mode 306. In other cases, the electronic device 100 can set the image sensors 102B, 102C, and 102N to a same state or can otherwise vary the states of the image sensors 102B, 102C, and 102N.

In some cases, the electronic device 100 can change the state of any of the image sensors 102B, 102C, and 102N proactively before the ROI 310 is outside of the FOV of such image sensors. For example, if the electronic device 100 predicts that the ROI 310 will be outside of the FOV 314 of the image sensor 102B within a certain period of time, the electronic device 100 can proactively change the state of the image sensor 102B from the enabled state 302 shown in FIG. 3A to the lower-power mode 304 shown in FIG. 3B to reduce a power consumption at the electronic device 100.

In some cases, if the ROI 310 is determined to be within the FOV of multiple image sensors (e.g., within an overlapping FOV region such as overlapping FOV region 320), the electronic device 100 can determine a trajectory of the ROI 310 (and/or the electronic device 100) and use the trajectory information to select an FOV and associated image sensor to maintain in or set to an enabled/higher-power state, and select a different FOV and associated image sensor to maintain in or set to an off/lower-power state.

Figure 4:
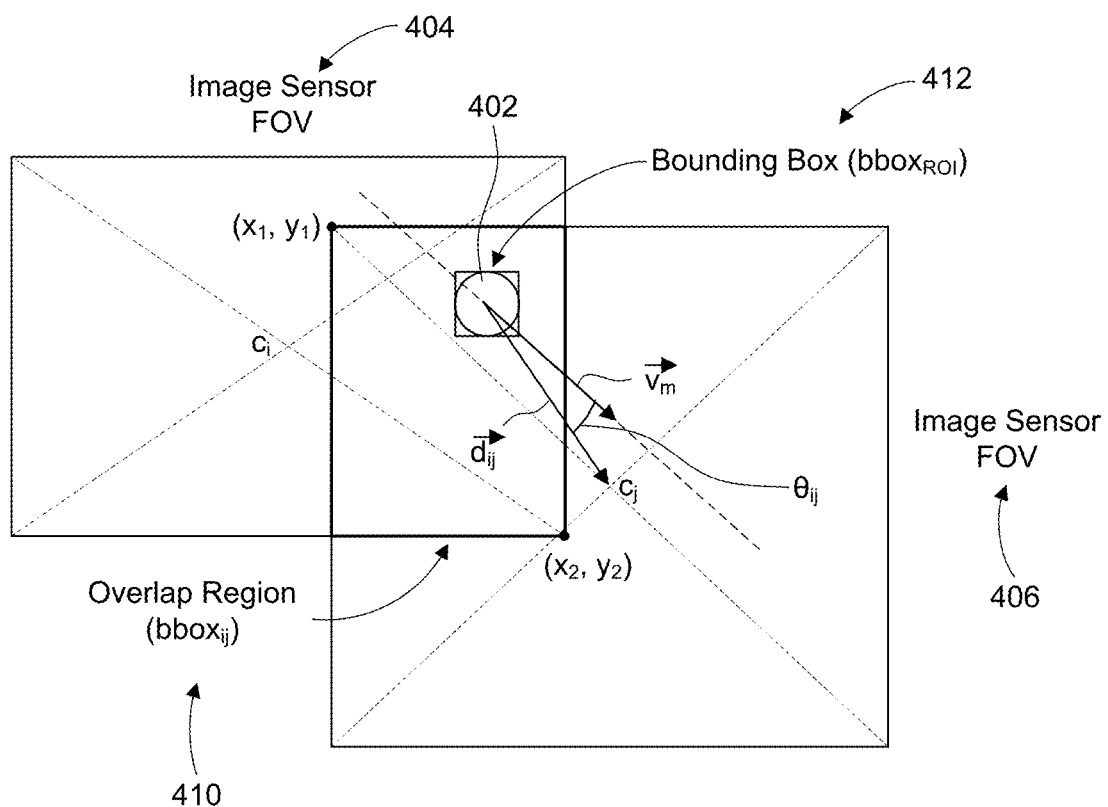
FIG. 4 is a diagram illustrating an example of a switch between image sensors based on a trajectory of region-of-interest, in accordance with some examples of the present disclosure.

FIG. 4 is a diagram illustrating an example of a switch between image sensors based on a trajectory of an ROI 402. The electronic device 100 can track a location of the ROI 402 to determine whether the ROI 402 is within the FOV of any image sensors and, if so, which image sensors. In this example, the electronic device 100 can determine that the ROI 402 is in an overlapping FOV region 410 within the FOV 404 of an image sensor and the FOV 406 of another image sensor. In some examples, the electronic device 100 can determine a bounding box 412 around the overlapping FOV region 410. For example, the electronic device 100 can determine a bounding box (e.g., bounding box 412) between a FOV (e.g., FOV 404) with a center at $c_i$ and a FOV (e.g., FOV 406) with a center at $c_j$ as follows: $bbox_{ij} = FOV_i \cap FOV_j = [x_1, y_1, x_2, y_2]_{ij}$. The box shape of the bounding box 412 in this example is provided for simplicity and illustration purposes, but other examples can include other shapes/geometries.

In some examples, when the ROI 402 enters the overlapping FOV region 410, the portion of the bounding box 412 (e.g., $bbox_{ROI}$) that entered the overlapping FOV region 410 can be calculated as follows:

$$Olap_{ij}^{ROI} = \frac{bbox_{ij} \cap bbox_{ROI}}{bbox_{ROI}} \qquad \text{Equation 1}$$

The electronic device 100 can use the direction and/or velocity of the movement of the ROI 402 to determine which image sensor feed to use/enable and/or to trigger any switches between image sensors used to capture the ROI 402. In some examples, if the overlapping FOV region 410 (e.g., $Olap_{ij}^{ROI}$) is over a threshold $\gamma_{ij}$, the electronic device 100 (e.g., via the tracker 122) can check if the ROI 402 is moving towards the center $c_j$ of the FOV 406 or the center $c_i$ of the FOV 404. In some cases, for an electronic device 100 with an overlapping FOV region that is larger than the ROI 402, $\gamma_{ij}$ can be set to 1. From the last m frames, the aggregated trajectory of each ROI $\vec{v_m}$ (where, m=1, 2, . . . , r) can be determined along with the velocity of movement. For the current image sensor feed associated with the FOV (e.g., FOV 404) with the center $c_i$, the electronic device 100 (e.g., via the tracker 122) can find the angle $\theta_j^m$ between $\vec{v_m}$ and $\vec{d_j}$ for all j=1, 2, . . . , N, using the following equation:

$$\theta_j^m = \cos^{-1}\left(\frac{\vec{v_m} \cdot \vec{d_j}}{|\vec{v_m}||\vec{d_j}|}\right) \qquad \text{Equation 2}$$

In some cases, if $|\theta_j^m|$ is less than a threshold $\alpha_1$, the electronic device 100 (e.g., via the controller 124) can prompt a switch from a current image sensor to the image sensor with the FOV (e.g., FOV 406) with the center at $c_1$, for which the angle $|\theta_j^m|$ between the velocity vector $\vec{v}_m$ and the distance vector $\vec{d}_j$ is smallest. In some cases, if there are more than one image sensor in the vicinity for which the conditions are satisfied, the image sensor for which $|\theta_j^m|$ is smaller can be chosen. The electronic device 100 can then switch to the chosen image sensor. In some cases, if the $|\theta_j^m|$ values are the same, the image sensor that can cover a larger FOV may be chosen. The electronic device 100 can then switch to the chosen image sensor.

In some examples, by switching from one image sensor to another, the electronic device 100 can change a state/mode of the current image sensor to the new current image sensor (e.g., the current image sensor after the switch). For example, when the electronic device 100 switches from one image sensor to another, the electronic device 100 can change a state of the current image sensor from a current state (e.g., enabled, higher-power mode) to a different state (e.g., an off state, a lower-power mode, etc.), and can change a state of the new current image sensor from a current state (e.g., a powered off state, a disabled state, a lower-power mode, etc.) to a different state (e.g., an enabled/on state, a higher-power mode, etc.). In some examples, when changing a state/mode of an image sensor, the electronic device 100 can additionally or alternatively change a processing path (e.g., a camera pipeline such as a lower-power camera pipeline or a higher-power camera pipeline) used to process image data captured by that image sensor.

In some cases, to prevent frequent image sensor switching, the electronic device 100 (e.g., via the tracker 122) can impose one or more conditions for triggering a switch. For example, the electronic device 100 can impose a condition on the magnitude of the velocity vector, such as $|\vec{v}_m|>\beta_{ij}$. In some examples, for smaller bbox$_{ij}$ areas, the value of $\beta_{ij}$ can be smaller than the value for larger box areas.

In some cases, if multiple image sensors have FOVs which are not overlapping, the electronic device (e.g., via the tracker 122) can determine whether to switch image sensors based on the velocity vector $|\vec{v}_m|$ and the angle $|\theta_j^m|$ between the velocity vector and a distance vector from an image sensor i to an image sensor j. Given the location of the ROI and the velocity vector at time t, the electronic device 100 (e.g., via the controller 124) can extrapolate the ROI's location at time t+1. If the ROI's location moves outside of the FOV of the current image sensor, the electronic device 100 (e.g., via the controller 124) can switch to the other image sensor along that direction.

In some cases, the electronic device 100 can also implement/fuse sensor data from one or more inertial measurement units (IMUS). For example, rapid electronic device (e.g., electronic device 100) movements and/or rapid ROI movements can sometimes place the ROI in the FOV of a different image sensor without the electronic device 100 detecting the ROI entering the FOV of the different image sensor. In some examples, the electronic device 100 can use a combination of ROI motion trajectory information and IMU sensor data describing movement of the electronic device 100 for use in the tracking and/or stabilizing of the ROI.

In some cases, the electronic device 100 can process a partial image (e.g., less than the entire image captured) corresponding to a partial FOV (e.g., less than the entire FOV of an image sensor). For example, an image sensor can support ROIs where only the pixels for ROIs can be transferred, thereby lowering the overall bandwidth and power to capture the desired pixels. In some cases, the ROC of an image sensor may be only partially processed in order to obtain a stable ROI stream. The partial ROC for processing may be determined by the electronic device 100 (e.g., via the controller 124) based on, for example, the ROI detection, the ROI tracking, stabilization requirements, etc. In some examples, processing reduced number of pixels can result in reduced post processing of the camera stream, which can reduce resource usage and power.

In some cases, a reinforcement learning (RL) agent can be trained to help the electronic device 100 determine which image sensors to operate and/or what settings to implement for one or more image sensors. The training inputs can include location information of timestamps (t-1, t-2, . . . , t-m) for each ROI. For the training, the inputs to the RL agent can include the last m ROI bbox information and the number of image sensors. Sequences of moving ROI bounding boxes of different sizes can be generated (e.g., randomly or otherwise). The RL agent can be rewarded if it is able to switch image sensors correctly so the ROI is within the FOV of the image sensor(s) that is enabled while reducing the number of enabled image sensors. Additional rewards can be used if the RL agent can minimize image sensor switches. In some cases, the reward can be inversely proportional to the number of image sensor switches. The RL agent can be penalized if the ROI is outside of the FOV of the image sensors that are currently enabled but within the FOV of one or more of the other image sensors of the electronic device 100.

In some examples, for N image sensors and k ROIs, the actions for the RL agent can produce N binary decisions, one for each image sensor, indicating whether an image sensor feed should be processed or not. The training can be simulated in a virtual environment with an additional input (s) to the RL agent so that it can be deployed without additional training for any setup. Additional inputs can include, for example and without limitation, IMU sensor data, an indication of a number of image sensors, camera intrinsic parameters, camera extrinsic parameters, metadata, and/or any other data. In some cases, for rapid movement (electronic device movement, ROI movement, etc.) and/or varying number of image sensors and parameters, the RL agent can be enabled to learn the mathematical rationale behind switching to another image sensor. Once trained for a fixed image sensor setup, the RL agent can prompt an image sensor switch given the last m ROI bounding box information, IMU sensor information, image sensor information, and/or any other information. In some examples, the RL-based tracker may propose a region of partial sensor information (e.g., less than all the sensor information) for each selected image sensor to reduce processing time and power further.

Figure 5:
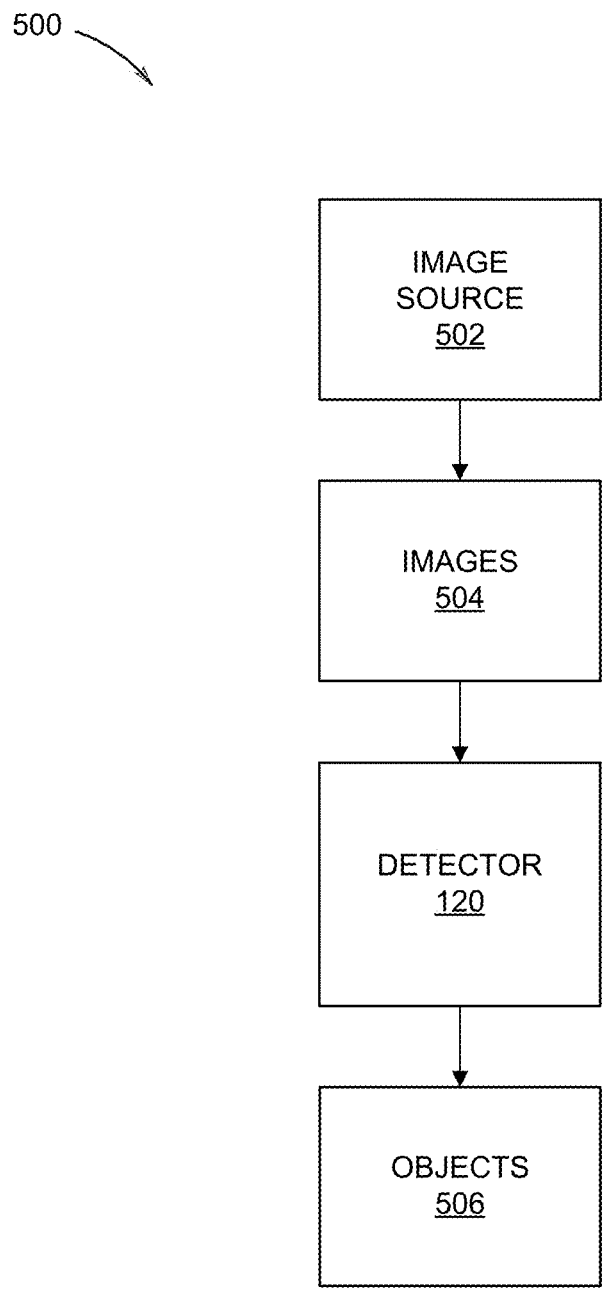
FIG. 5 is a block diagram illustrating an example of system for detecting objects in one or more images, in accordance with some examples of the present disclosure.

FIG. 5 is a block diagram illustrating an example of a system for detecting objects in one or more images. The one or more images can include images or video frames. For example, the detection system 500 can receive images 504 from an image source 502. The images 504 can also be referred to herein as video pictures or pictures. The image source 502 can include one or more image sensors (e.g., one or more of the image sensors 102). The images 504 can capture or contain images of a scene. In some examples, one or more of the images 504 can capture or contain an ROI in the scene.

While images are used herein as an example of images on which object detection is performed, one of ordinary skill will appreciate that the object detection techniques described herein can be performed on any images and/or video frames, such as still images captured by an image sensor, a group of images captured by an image sensor that are or are not part of a video, or other suitable images.

In some examples, the detection system 500 can include the detector 120. In some cases, the detection system 500 can also include the tracker 122. The detection system 500 processes the images 504 to detect and/or track objects in the images 504. In some cases, the objects can correspond to a ROI in a scene captured by the images 504. In some examples, the objects can also be recognized by comparing features of the detected and/or tracked objects with enrolled objects that are registered with the detection system 500. In some cases, multi-resolution features can be generated and used for object recognition. For example, low resolution features can be used for smaller detected objects (e.g., objects that are far away from image source 502 during capture, or other small objects). In some cases, higher resolution features can be used for bigger objects (e.g., those objects that are closer to image source 502 during capture, or other bigger objects). The detection system 500 can determine and/or output objects 506 as detected (and possibly tracked) objects and/or as recognized objects. In some examples, the detection system 500 can determine and/or output an ROI corresponding to the objects 506 as a detected (and possibly tracked) ROI.

Any type of object detection and recognition can be performed by the detection system 500. An example of object detection and recognition includes face detection and/or recognition, where faces of people in a scene captured by video frames (or other images) can be analyzed for detection, tracking, and/or recognition using the techniques described herein. An example face recognition process identifies and/or verifies an identity of a person from an image (s). In some cases, the features of the face are extracted from the image and compared with features of known faces stored in a database (e.g., an enrolled database or other storage). In some cases, the extracted features can be fed to a classifier that determines the identity of the input features or helps categorize the object based on the features found. For example, if two eyes, a nose, and a mouth are found in close proximity to each other, it is likely that these belong to a face, which is a type of object that the classifier can help identify. One illustrative example of a process for recognizing a face includes performing face detection, face tracking, facial landmark detection, face normalization, feature extraction, and face identification and/or face verification. Face detection is a kind of object detection in which the focus includes detecting objects that are faces. While techniques are described herein using face detection/recognition as an illustrative example of object recognition, one of ordinary skill will appreciate that the same techniques can apply to recognition of other types of objects/ROIs, such as other portions of the human body, vehicles, animals, human beings, queues, food, beverages, products, articles of clothing, computing devices, currencies, street signs, street lights, typed or handwritten text, landmarks, environments, and/or other types of objects.

Figure 6:
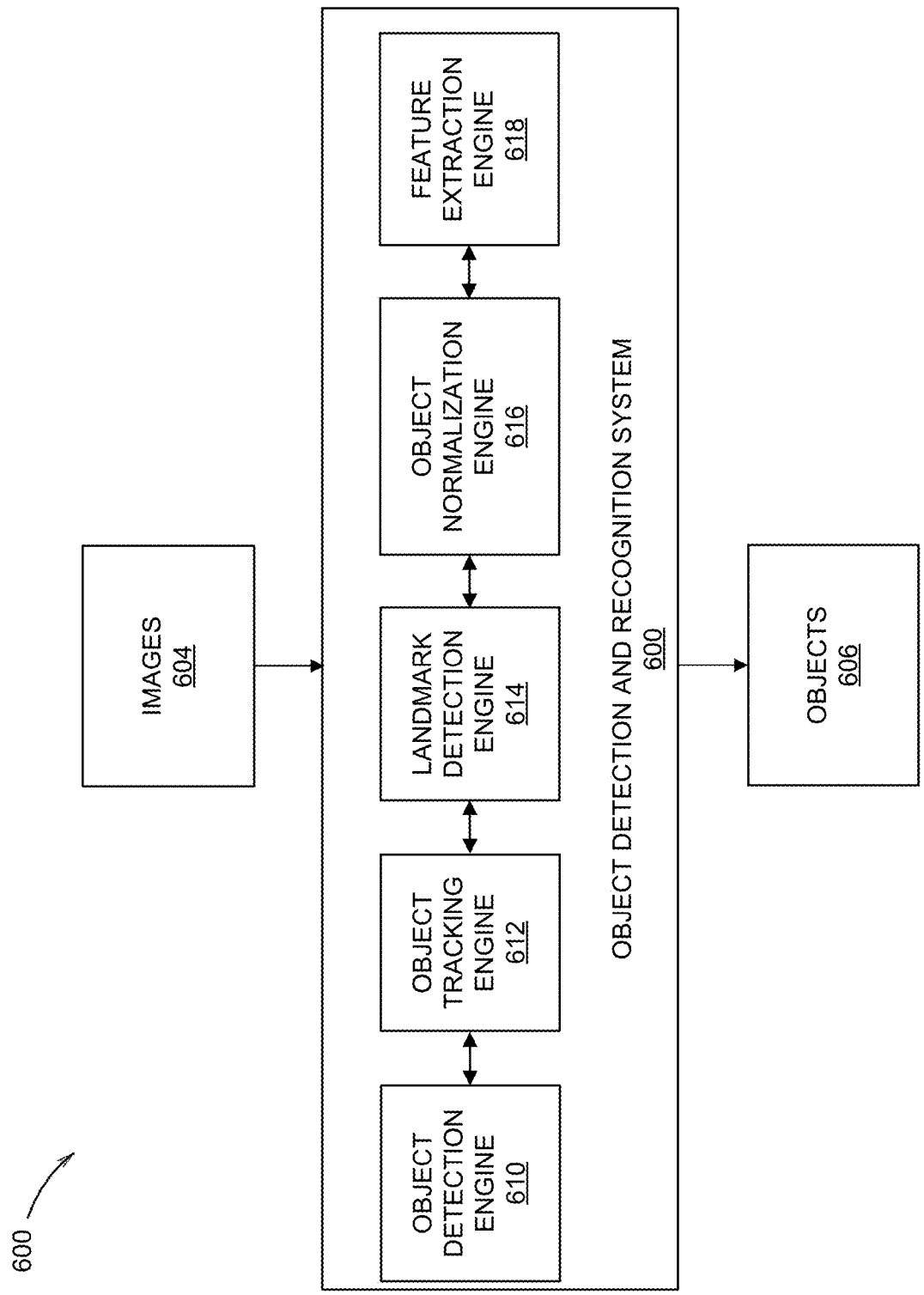
FIG. 6 is an example of an object detection system that can perform object detection, in accordance with some examples of the present disclosure.

FIG. 6 is a block diagram illustrating an example of an detection system 600. The detection system 600 processes images 604 and outputs objects 606 (e.g., ROIs) as detected, tracked, and/or recognized. The detection system 600 can perform any type of object detection and/or recognition.

In some examples, the detection system 600 can include the detector 120. In some cases, the detection system 600 can also include the tracker 122. In some examples, the detection system 600 includes an object detection engine 610 that can perform object detection. Object detection is a technology to detect or locate objects from an image or video frame. Detected objects can be represented using bounding regions that identify the location and/or approximate boundaries of the object in the image or video frame. A bounding region of a detected object can include a bounding box, a bounding circle, a bounding ellipse, or any other suitably-shaped region representing a detected object. While examples are described herein using bounding boxes for illustrative purposes, the techniques and systems described herein can also apply using other suitably shaped bounding regions. In one illustrative example, the object detection engine 610 can perform face detection to detect one or more faces in an image or video frame. The object detection engine 610 can provide a bounding box for each detected face. Many object detection algorithms (including face detection algorithms) use template matching techniques to locate objects from the images. Various types of template matching algorithms can be used. Other object detection algorithm can also be used by the object detection engine 610.

One example of a template matching algorithm includes steps for Haar or Haar-like feature extraction, integral image generation, Adaboost training, and/or cascaded classifiers. Such an object detection technique performs detection by applying a sliding window across a frame or image, the window being rectangular, circular, triangular, or another shape. An Integral image may be computed to be an image representation evaluating particular regional features, for example rectangular or circular features, from an image. For each current window, the Haar features of the current window are computed from an Integral image, which is computed beforehand. The Harr features may be computed by calculating sums of image pixels within particular feature regions of the object image, such as those of the Integral image. In faces, for example, a region with an eye is typically darker than a region with a nose bridge or cheeks. The Haar features are selected by an Adaboost learning algorithm that selects the best features and/or trains classifiers that use them, and can be used to classify a window as a face (or other object) window or a non-face window effectively with a cascaded classifier. The cascaded classifier includes many classifiers combined in a cascade, which allows background regions of the image to be quickly discarded while spending more computation on object-like regions. For example, the cascaded classifier can classify a current window into a face category or a non-face category.

If one classifier classifies a window as a non-face category, the window is discarded. Otherwise, if one classifier classifies a window as a face category, a next classifier in the cascaded arrangement will be used to test again. Until all the classifiers determine the current window is a particular object (e.g., a face or other object), the window will be labeled as a candidate for being the object. After all the windows are detected, a non-max suppression algorithm is used to group the face windows around each face to generate the final result of detected faces.

Other suitable object detection techniques can also be performed by the object detection engine 610. One other illustrative example of an object detection technique includes example-based learning for view-based face detection. Another example is neural network-based object detection. Yet another example is statistical-based object detection. Another example is a snowbased object detector or a joint induction object detection technique. Any other suitable image-based object detection techniques can be used.

The detection system 600 further includes an object tracking engine 612 that can perform object tracking (e.g., ROI tracking) for one or more of the objects detected by the object detection engine 610. Object tracking can include tracking objects across multiple images/frames of a video sequence or a sequence of images. In one illustrative example, the object tracking engine 612 can track objects/ROIs detected by the object detection engine 610. For instance, face tracking can be performed to track faces across frames or images. As used herein, a current frame or image refers to a frame or image currently being processed. In order to reduce the time and resources used for object recognition, object tracking techniques can be used to track previously recognized objects. For example, if a face has been recognized and the detection system 600 is confident of the recognition results (e.g., a high confidence score is determined for the recognized face), the detection system 600 can skip a full recognition process for the face in one or several subsequent frames/images if the face can be tracked successfully by the object tracking engine 612.

Any suitable object tracking technique can be used by the object tracking engine 612. Examples of trackers that can be used include optical flow based trackers, template matching based trackers, meanshift trackers, continuously adaptive meanshift (camshift) trackers, Kernelized Correlation Filters (KCF) trackers, Kalman filter based trackers, or other suitable tracker can be used. For example, in some cases, dense optical flow based trackers can estimate the motion vector of pixels (in some cases, all pixels) in a video frame in order to track the movement of the pixels across frames/images. For instance, image motion can be recovered at each pixel from spatio-temporal image brightness variations. In some cases, sparse optical flow based trackers (e.g., the Kanade-Lucas-Tomashi (KLT) tracker) can track the location of one or more specific feature points (e.g., one or more corners, textured areas, edges, or other distinct or visual features) in an image.

Template matching based trackers obtain a template of an image feature that is to be tracked across images, and use the template to search for the image feature in the images. For example, as the template slides across an input image, the template is compared or matched to the portion of the image directly under it. The matching is performed by calculating a number that indicates the extent to which the template and the portion of the original image at which the template is currently located are equal (or correlated). The location in the original image that has the greatest correlation (minimum difference from the template) is where the image feature represented by the template is located in the original image. The matching number can depend on the calculation that is used by the template matching algorithm. In one illustrative example, a complete match can be denoted by a 0 (indicating zero difference between the template and the portion of the original image) or a 1 (indicating a complete match).

Meanshift and camshift trackers locate the maxima of a density function to perform tracking. For instance, given a set of points, such as a pixel distribution (e.g., using a histogram backprojected image, which records how well the pixels of a given image fit the distribution of pixels in a histogram model, or other suitable distribution) and a window region, the meanshift tracker can move the window region to the area of maximum pixel density (e.g., to the area with a maximum number of points in the distribution). When an object moves from one image to another, the movement is reflected in pixel distribution (e.g., the histogram backprojected image). The meanshift tracker can then move the window region to the new location with maximum density. A camshift tracker is a modified meanshift tracker that can adapt the window size using a size and rotation of the target object. The camshift tracker can first apply the meanshift operation, and once the meanshift converges, the camshift tracker updates the size of the window (e.g., with the updated size $$s = 2 \times \sqrt{\frac{M_{00}}{256}}$$

). The camshift tracker can also calculate the orientation of a best fitting shape (e.g., ellipse, circle, square, or the like) to the target. The tracker can apply the meanshift technique with a new scaled search window and previous window location. The process is continued until the required accuracy is achieved.

A KCF filter is a correlation filter based trackers, and attempts to identify the best filter taps that maximize the response when correlated with a target template that looks similar in appearance to training data. KCF tracks objects by solving a simple rigid regression problem over training data in the dual form, which allows the use of both multi-dimensional features and non-linear kernels (e.g., Gaussian).

A Kalman filter based object tracker uses signal processing to predict the location of a moving object based on prior motion information. For example, the location of a tracker in a current frame can be predicted based on information from a previous frame. In some cases, the Kalman filter can measure a tracker's trajectory as well as predict its future location(s). For example, the Kalman filter framework can include two steps. The first step is to predict a tracker's state, and the second step is to use measurements to correct or update the state. In this case, the tracker from the last frame can predict its location in the current frame. When the current frame is received, the tracker can use the measurement of the object in the current frame to correct its location in the current frame, and then can predict its location in the next frame. The Kalman filter can rely on the measurement of the associated object(s) to correct the motion model for the object tracker and to predict the location of the tracker in the next frame.

Another illustrative example of an object tracking technique includes a key point technique. Using face tracking as an example, the key point technique can include detecting some key points from a detected face (or other object) in a previous frame. For example, the detected key points can include significant points on face, such as facial landmarks (described in more detail below). The key points can be matched with features of objects in a current frame using template matching. Examples of template matching methods can include optical flow (as described above), local feature matching, and/or other suitable techniques. In some cases, the local features can be histogram of gradient, local binary pattern (LBP), or other features. Based on the tracking results of the key points between the previous frame and the current frame, the faces in the current frame that match faces from a previous frame can be located.

Another example object tracking technique is based on the face detection results. For example, the intersection over union (IOU) of face bounding boxes can be used to determine if a face detected in the current frame matches a face detected in the previous frame.

In some cases, the detection system 600 can optionally include a landmark detection engine 614. An illustrative example of landmark detection is based on a cascade of regressors method. Using such a method, a cascade of regressors can be learned from objects with labeled landmarks. A combination of the outputs from the cascade of the regressors provides accurate estimation of landmark locations. The local distribution of features around each landmark can be learned and the regressors will give the most probable displacement of the landmark from the previous regressor's estimate. The landmark detection engine 614 may also start with a loose template of where certain landmark features are expected to be found based on the type of object. Any other suitable landmark detection techniques can also be used by the landmark detection engine 614.

The detection system 600 can optionally include an object normalization engine 616 for performing object normalization. Object normalization can be performed to align objects for better object recognition results. For example, the object normalization engine 616 can perform face normalization by processing an image to align and/or scale the faces in the image for better recognition results. One example of a face normalization method uses two eye centers as reference points for normalizing faces. The face image can be translated, rotated, and scaled to ensure the two eye centers are located at the designated location with a same size. A similarity transform can be used for this purpose. Another example of a face normalization method can use five points as reference points, including two centers of the eyes, two corners of the mouth, and a nose tip.

In some cases, the illumination of the object images may also be normalized. One example of an illumination normalization method is local image normalization. With a sliding window be applied to an image, each image patch is normalized with its mean and standard deviation. The center pixel value is subtracted from the mean of the local patch and then divided by the standard deviation of the local patch. Another example method for lighting compensation is based on discrete cosine transform (DCT). For instance, the second coefficient of the DCT can represent the change from a first half signal to the next half signal with a cosine signal. This information can be used to compensate a lighting difference caused by side light, which can cause part of an object (e.g., half of the object) to be brighter than the remaining part (e.g., the other half) of the object. The second coefficient of the DCT transform can be removed and an inverse DCT can be applied to get the left-right lighting normalization.

The feature extraction engine 618 performs feature extraction, which can be used for object detection and/or recognition. An example of a feature extraction process is based on steerable filters. A steerable filter-based feature extraction approach operates to synthesize filters using a set of basis filters. For instance, the approach provides an efficient architecture to synthesize filters of arbitrary orientations using linear combinations of basis filters. Such a process provides the ability to adaptively steer a filter to any orientation, and to determine analytically the filter output as a function of orientation.

Steerable filters can be convolved with object images to produce orientation maps which in turn can be used to generate features (represented by feature vectors). For instance, because convolution is a linear operation, the feature extraction engine 618 can synthesize an image filtered at an arbitrary orientation by taking linear combinations of the images filtered with the basis filters $G_1^{0°}$ and $G_1^{90°}$. In some cases, the features can be from local patches around selected locations on detected objects/ROIs). Steerable features from multiple scales and orientations can be concatenated to form an augmented feature vector that represents an object/ROI image.

In one illustrative example, the feature extraction engine 618 can apply one or more low pass filters to the orientation maps, and can use energy, difference, and/or contrast between orientation maps to obtain a local patch. A local patch can be a pixel level element. For example, an output of the orientation map processing can include a texture template or local feature map of the local patch of the object/ROI being processed. The resulting local feature maps can be concatenated to form a feature vector for the object/ROI image.

Postprocessing on the feature maps, such as Linear discriminant analysis (LDA) and/or Principal Component Analysis (PCA), can also be used to reduce the dimensionality of the feature size. In order to compensate for possible errors in landmark detection, a multiple scale feature extraction can be used to make the features more robust for matching and/or classification.

Other feature detection and dimensionality reduction methods and systems may alternately or additionally be employed, including edge detection, corner detection, blob detection, ridge detection, scale-invariant feature transform, autocorrelation, motion detection, optical flow, thresholding, blob extraction, template matching Hough transform, active contours, independent component analysis, Isomap, Kernel PCA, latent semantic analysis, Partial least squares, principal component analysis, multifactor dimensionality reduction, nonlinear dimensionality reduction, multilinear principal component analysis, multilinear subspace learning, semidefinite embedding, autoencoder, or combinations thereof.

As previously explained, various object detectors can be used to perform object detection and/or classification. One example includes a Cifar-10 neural network based detector. Another deep learning-based detector that can be used to detect and/or classify objects in images includes a single-shot detector (SSD) detector, which is a fast single-shot object detector that can be applied for multiple object categories or classes. The SSD model uses multi-scale convolutional bounding box outputs attached to multiple feature maps at the top of the neural network. Such a representation allows the SSD to efficiently model diverse box shapes. FIG. 7A includes an image and FIG. 7B and FIG. 7C include diagrams illustrating how an SSD detector (e.g., with a VGG deep network base model) operates. For example, SSD matches objects with default boxes of different aspect ratios (shown as dashed rectangles in FIG. 7B and FIG. 7C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (shown in blue in FIG. 7B) are matched with the cat, and one of the 4×4 boxes (shown in red in FIG. 7C) is matched with the dog. SSD has multiple features maps, with each feature map being responsible for a different scale of objects, allowing it to identify objects across a large range of scales. For example, the boxes in the 8×8 feature map of FIG. 7B are smaller than the boxes in the 4×4 feature map of FIG. 7C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 7A, all probability labels would indicate the background class with the exception of the three matched boxes (two for the cat, one for the dog).

Figure 8A:
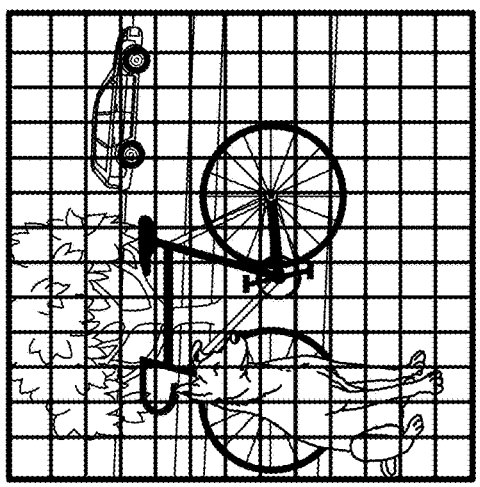
FIG. 8A-FIG. 8C are diagrams illustrating an example of a you only look once (YOLO) detector, in accordance with some examples of the present disclosure.
Figure 8B:
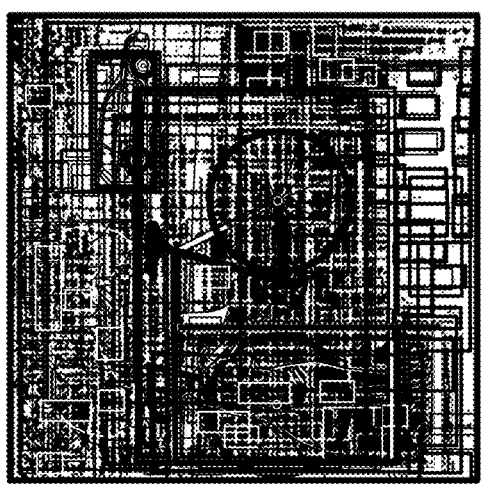

Another deep learning-based detector that can be used to detect and/or classify objects in images includes the You only look once (YOLO) detector, which is an alternative to the SSD object detection system. FIG. 8A includes an image and FIG. 8B and FIG. 8C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 8A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 8B. The boxes with higher confidence scores have thicker borders.

Figure 8C:
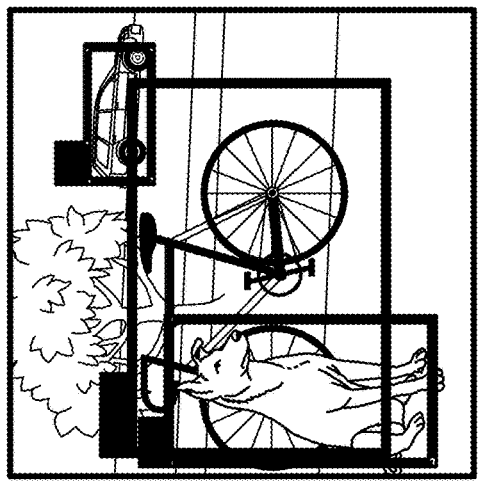

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the yellow box with thick borders on the left side of the image in FIG. 8B is 85% sure it contains the object class "dog." There are 169 grid cells (13×13) and each cell predicts 5 bounding boxes, resulting in 4645 bounding boxes in total. Many of the bounding boxes will have very low scores, in which case only the boxes with a final score above a threshold (e.g., above a 30% probability, 40% probability, 50% probability, or other suitable threshold) are kept. FIG. 8C shows an image with the final predicted bounding boxes and classes, including a dog, a bicycle, and a car. As shown, from the 4645 total bounding boxes that were generated, only the three bounding boxes shown in FIG. 8C were kept because they had the best final scores.

Figure 9:
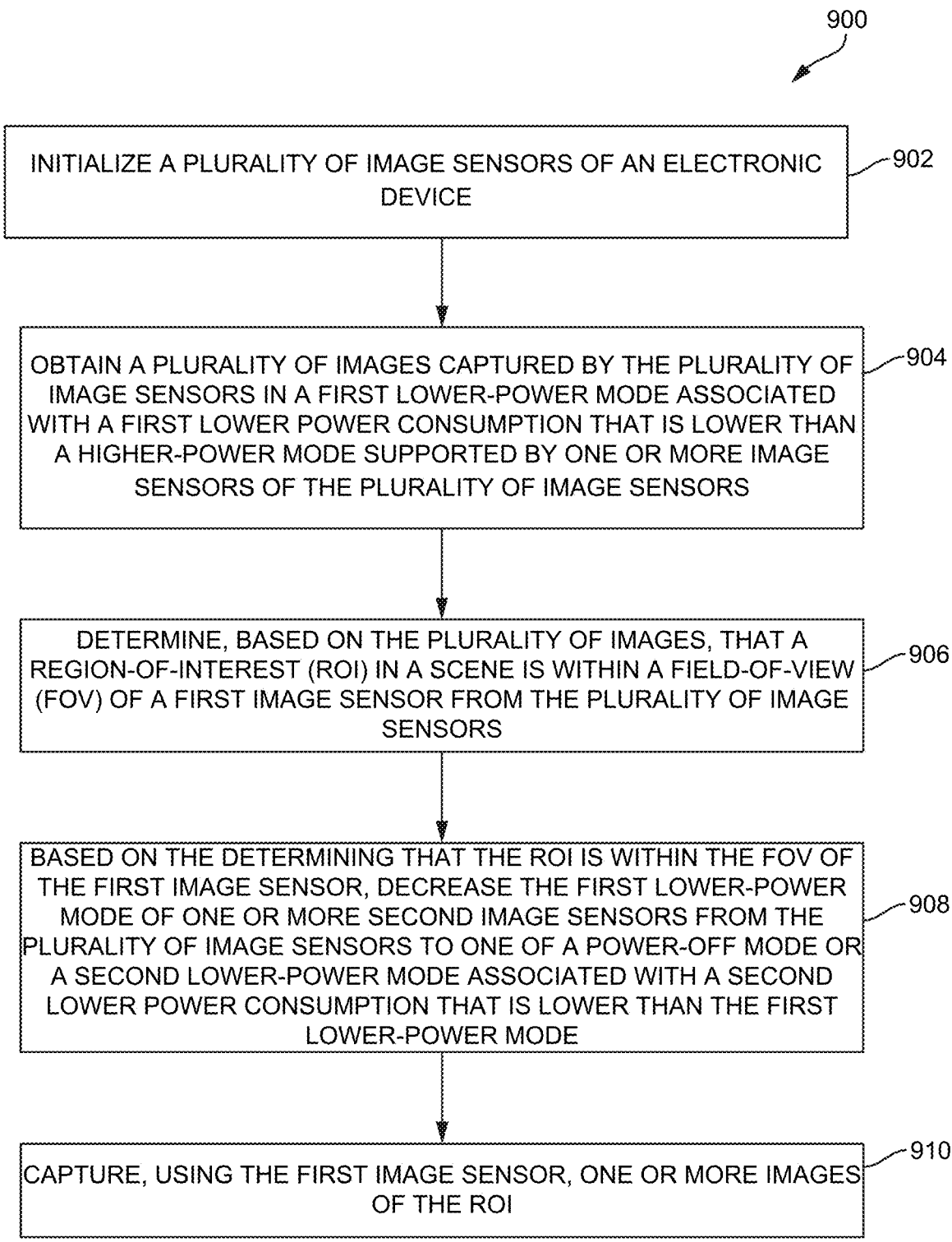
FIG. 9 is a flowchart illustrating an example process for capturing a region-of-interest with a multi-camera system, in accordance with some examples of the present disclosure.

FIG. 9 is a flowchart illustrating an example process 900 for capturing a region of interest (ROI) with a multi-camera system (e.g., electronic device 100). At block 902, the process 900 can include initializing a plurality of image sensors (e.g., image sensors 102) of an electronic device (e.g., electronic device 100). In some examples, each image sensor of the plurality of image sensors is initialized in a first lower-power mode associated with a first lower power consumption that is lower than a higher-power mode (e.g., the first lower power consumption is lower than a power consumption associated with the higher-power mode) supported by one or more image sensors of the plurality of image sensors.

At block 904, the process 900 can include obtaining a plurality of images captured by the plurality of image sensors in the first lower-power mode. For example, the electronic device 100 can use the plurality of image sensors operating in the first lower-power mode to capture images of a scene.

At block 906, the process 900 can include determining, based on the plurality of images, that an ROI in a scene is within a FOV of a first image sensor (or multiple image sensors) from the plurality of image sensors. The scene can include any scene captured by at least one of the plurality of images. The scene can include the ROI. The ROI can include any ROI that is intended to be captured, detected, and/or tracked by the electronic device 100 as further explained herein. In some examples, the ROI can include a portion of a scene, one or more objects, one or more patterns, any other items/features, and/or any combination thereof. The ROI can include a static ROI or an ROI that moves or can move (e.g., a dynamic or mobile ROI).

At block 908, the process 900 can include, based on determining that the ROI is within the FOV of the first image sensor, decreasing the first lower-power mode of one or more second image sensors from the plurality of image sensors to a power-off mode or a second lower-power mode associated with a second lower power consumption that is lower than the first lower-power mode (e.g., the second lower power consumption is lower than the first power consumption associated with the first lower-power mode). For example, the electronic device 100 can decrease the first lower-power mode of all other image sensors (e.g., except the first image sensor) or a subset of image sensors from the plurality of image sensors. The other image sensors or the subset of image sensors can include those of the plurality of image sensors that do not have a view to the ROI (e.g., the ROI is not within a FOV of such image sensors).

In some examples, decreasing the first lower-power mode can include turning off the one or more second image sensors. In some cases, the second lower-power mode can include a power mode that is lower than the first lower-power mode in which the plurality of image sensors are initialized at block 902. In some examples, the second lower-power mode can include a sleep mode, a hibernation mode, a lower resolution mode, a lower framerate mode, a lower resource consumption mode, a mode that uses a processing path (e.g., a camera pipeline) that uses less resources (e.g., power, compute, etc.) than another processing path associated with the first lower-power mode in which the plurality of image sensors are initialized and/or a higher-power mode.

At block 910, the process 900 can include capturing, using the first image sensor, one or more images of the ROI. In some examples, the process 900 can include detecting the ROI in one or more of the plurality of images. In some cases, the process 900 can include tracking the ROI using data from one or more sensors such as, for example and without limitation, image data from one or more of the plurality of image sensors, audio sensor 104, IMU 106, and/or any other sensor(s).

In some examples, the process 900 can include, based on determining that the ROI is within the FOV of the first image sensor, transitioning the first image sensor from the first lower-power mode to the higher-power mode. The process 900 can further include capturing the one or more images of the ROI using the first image sensor in the higher-power mode. In some cases, transitioning the first image sensor from the first lower-power mode to the higher-power mode can include adjusting, based on determining that the ROI is within the FOV of the first image sensor, a first exposure setting of the first image sensor. Based on a determination that the ROI is outside of one or more FOVs of the one or more second image sensors, the process 900 can include adjusting a sleep setting and/or a second exposure setting of the one or more second image sensors.

In some cases, transitioning the first image sensor from the first lower-power mode to the higher-power mode can include processing data from the one or more second image sensors using one or more resources having a lower power consumption than one or more other resources used to process the one or more images captured by the first image sensor. In some cases, transitioning the first image sensor from the first lower-power mode to the higher-power mode can include turning off the one or more second image sensors, reducing a resolution of the one or more second image sensors, and/or reducing a framerate of the one or more second image sensors.

In some examples, the process 900 can include determining that the ROI is within an overlapping portion (e.g., an overlapping FOV region) of the FOV of the first image sensor and a different FOV of a second image sensor from the plurality of image sensors. The process 900 can further include determining a first power cost associated with the first image sensor and a second power cost associated with the second image sensor. The process 900 can include adjusting a power mode of the first image sensor and the second image sensor based on the first power cost and the second power cost. In some examples, adjusting the power mode of the first image sensor and the second image sensor can include increasing the power mode of the second image sensor, and decreasing the power mode of the first image sensor. In some cases, the second image sensor can have a lower power cost than the second image sensor.

In some cases, determining the first power cost and the second power cost can include applying a first weight associated with the first image sensor to the first power cost and a second weight associated with the second image sensor to the second power cost. In some examples, the first weight and the second weight are based on a respective image quality attribute associated with the first image sensor and the second image sensor, a respective power consumption associated with the first image sensor and the second image sensor, and/or one or more respective processing capabilities associated with the first image sensor and the second image sensor. In some examples, the process 900 can include capturing an image of the ROI using the second image sensor. The process 900 can further include adjusting, using a neural network, one or more visual characteristics of the image based on the image, at least an additional image of the ROI captured by the first image sensor, and/or motion information associated with the image. In some examples, the second image sensor can be associated with a lower image quality attribute than the first image sensor.

In some examples, the process 900 can include initializing one or more object detectors for one or more image sensors from the plurality of image sensors. In some cases, the one or more object detectors can be initialized in a first mode associated with a third lower-power consumption that is lower than a second mode supported by the one or more object detectors (e.g., the third lower power consumption is lower a power consumption associated with the second mode). The process 900 can further include determining that the ROI is outside of a second FOV of each of the one or more image sensors. Based on determining that the ROI is outside of the second FOV of each of the one or more image sensors, the process 900 can further include running the one or more image sensors in the first lower-power mode with the one or more object detectors in the first mode associated with the third lower-power consumption.

In some examples, the process 900 can include determining that the ROI is within respective FOVs of a set of image sensors from the plurality of image sensors. The process 900 can further include coordinating a capture of camera exposures across at least a portion of the set of image sensors. The process 900 can include generating one or more images based on the camera exposures captured using at least the portion of the set of image sensors.

In some examples, the process 900 can include determining, based on a movement of the electronic device and/or the ROI, that the ROI is outside of the FOV of the first image sensor and within a different FOV of a second image sensor from the plurality of image sensors. Based on determining that the ROI is outside of the FOV of the first image sensor and within the different FOV of the second image sensor, the process 900 can include reducing a power mode associated with the first image sensor and increasing an additional power mode associated with the second image sensor. The process 900 can further include capturing, by the second image sensor, one or more additional images of the ROI. In some aspects, increasing the additional power mode associated with the second image sensor can include turning on the second image sensor, increasing a resolution of the second image sensor, increasing a framerate of the second image sensor, and/or processing data from the second image sensor using one or more resources having a higher power consumption than one or more different resources associated with the reduced power mode associated with the first image sensor.

In some examples, the process 900 can include determining, based on a movement of the electronic device and/or the ROI, that the ROI is within a first portion of the FOV of the first image sensor and a second portion of a different FOV of a second image sensor from the plurality of image sensors. The process 900 can further include determining a trajectory of the ROI relative to the FOV and the different FOV. Based on the trajectory of the ROI, the process 900 can include switching from the first image sensor to the second image sensor. The process 900 can further include capturing, by the second image sensor, one or more additional images of the ROI. In some examples, switching from the first image sensor to the second image sensor can include reducing a power mode associated with the first image sensor and increasing an additional power mode associated with the second image sensor.

In some examples, the process 900 can include tracking a location of the ROI based on the one or more images captured by the first image sensor. The process 900 can further include adjusting one or more power modes associated with one or more image sensors from the plurality of image sensors. In some examples, the one or more power modes can be adjusted based on the location of the ROI and one or more properties of the one or more image sensors.

In some examples, the process 900 may be performed by one or more computing devices or apparatuses. In one illustrative example, the process 900 can be performed by the electronic device 100 shown in FIG. 1. In some examples, the process 900 can be performed by one or more computing devices with the computing device architecture 1000 shown in FIG. 10. In some cases, such a computing device or apparatus may include a processor, microprocessor, microcomputer, or other component of a device that is configured to carry out the steps of the process 900. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900 is illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
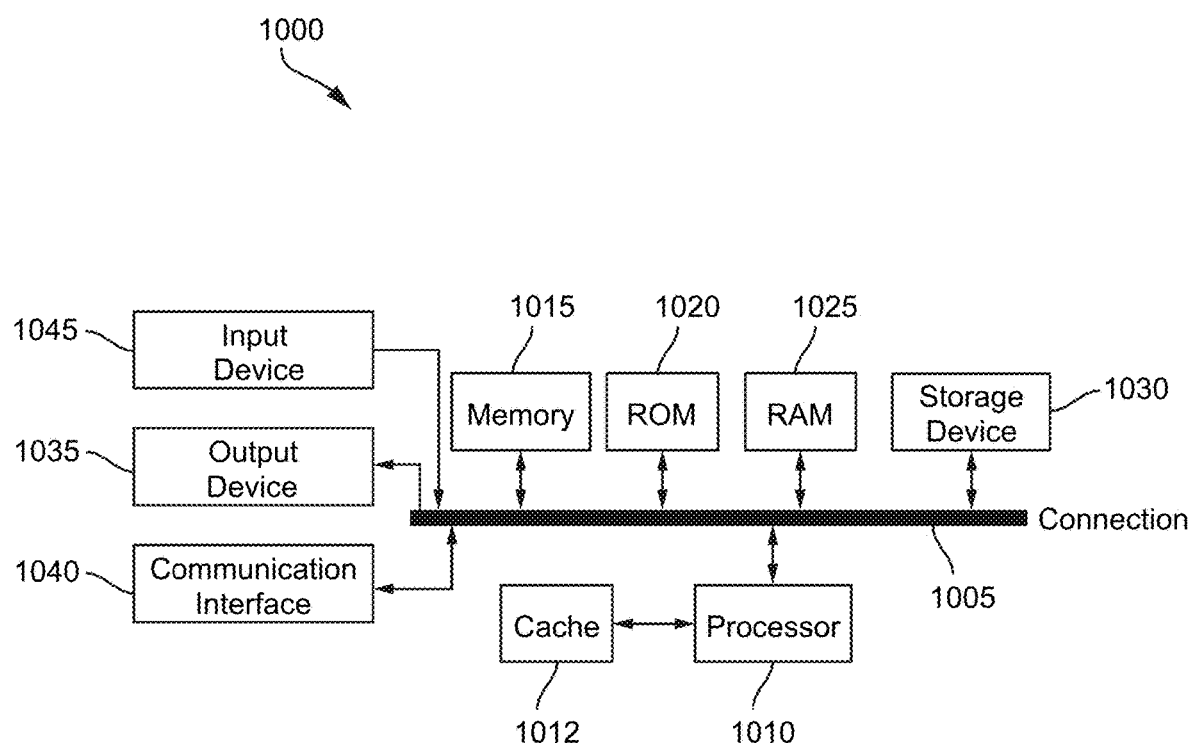
FIG. 10 illustrates an example computing device architecture, in accordance with some examples of the present disclosure.

FIG. 10 illustrates an example computing device architecture 1000 of an example computing device which can implement various techniques described herein. For example, the computing device architecture 1000 can implement at least some portions of the electronic device 100 shown in FIG. 1. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general-purpose processor and a hardware or software service stored in storage device 1030 and configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device. In some instances, multimodal computing devices can enable a user to provide multiple types of input to communicate with the computing device architecture 1000. The communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include software, code, firmware, etc., for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus comprising: a memory; and one or more processors coupled to the memory, the one or more processors being configured to: initialize a plurality of image sensors of an electronic device, each image sensor of the plurality of image sensors being initialized in a first lower-power mode associated with a first lower power consumption that is lower than a higher-power mode supported by one or more image sensors of the plurality of image sensors; obtain a plurality of images captured by the plurality of image sensors in the first lower-power mode; determine, based on the plurality of images, that a region-of-interest (ROI) in a scene is within a field-of-view (FOV) of a first image sensor from the plurality of image sensors; based on determining that the ROI is within the FOV of the first image sensor, decrease the first lower-power mode of one or more second image sensors from the plurality of image sensors to one of a power-off mode or a second lower-power mode associated with a second lower power consumption that is lower than the first lower-power mode; and capture, using the first image sensor, one or more images of the ROI.

Aspect 2. The apparatus of Aspect 1, wherein the one or more processors are configured to: based on determining that the ROI is within the FOV of the first image sensor, transition the first image sensor from the first lower-power mode to the higher-power mode; and capture the one or more images of the ROI using the first image sensor in the higher-power mode.

Aspect 3. The apparatus of Aspect 2, wherein, to transition the first image sensor from the first lower-power mode to the higher-power mode, the one or more processors are configured to: based on determining that the ROI is within the FOV of the first image sensor, adjust a first exposure setting of the first image sensor; and based on a determination that the ROI is outside of one or more FOVs of the one or more second image sensors, adjust at least one of a sleep setting and a second exposure setting of the one or more second image sensors.

Aspect 4. The apparatus of any of Aspects 2 to 3, wherein, to transition the first image sensor from the first lower-power mode to the higher-power mode, the one or more processors are configured to: process data from the one or more second image sensors using one or more resources having a lower power consumption than one or more other resources used to process the one or more images captured by the first image sensor.

Aspect 5. The apparatus of Aspect 2, wherein, to transition the first image sensor from the first lower-power mode to the higher-power mode, the one or more processors are configured to at least one of turn off the one or more second image sensors, reduce a resolution of the one or more second image sensors, and reduce a framerate of the one or more second image sensors.

Aspect 6. The apparatus of any of Aspects 1 to 5, wherein the one or more processors are configured to: determine that the ROI is within an overlapping portion of the FOV of the first image sensor and a different FOV of a second image sensor from the plurality of image sensors; determine a first power cost associated with the first image sensor and a second power cost associated with the second image sensor; and adjust a power mode of the first image sensor and the second image sensor based on the first power cost and the second power cost.

Aspect 7. The apparatus of Aspect 6, wherein, to adjust the power mode of the first image sensor and the second image sensor, the one or more processors are configured to: increase the power mode of the second image sensor, the second image sensor having a lower power cost than the second image sensor; and decrease the power mode of the first image sensor.

Aspect 8. The apparatus of any of Aspects 6 to 7, wherein the one or more processors are configured to: capture an image of the ROI using the second image sensor, wherein the second image sensor is associated with a lower image quality attribute than the first image sensor; and adjust, using a neural network, one or more visual characteristics of the image based on at least one of the image, at least an additional image of the ROI captured by the first image sensor, and motion information associated with the image.

Aspect 9. The apparatus of any of Aspects 6 to 8, wherein, to determine the first power cost and the second power cost, the one or more processors are configured to: apply a first weight associated with the first image sensor to the first power cost and a second weight associated with the second image sensor to the second power cost.

Aspect 10. The apparatus of any of Aspects 6 to 9, wherein the first weight and the second weight are based on at least one of a respective image quality attribute associated with the first image sensor and the second image sensor, a respective power consumption associated with the first image sensor and the second image sensor, and one or more respective processing capabilities associated with the first image sensor and the second image sensor.

Aspect 11. The apparatus of any of Aspects 1 to 10, wherein the one or more processors are configured to: initialize one or more object detectors for one or more image sensors from the plurality of image sensors, the one or more object detectors being initialized in a first mode associated with a third lower-power consumption that is lower than a second mode supported by the one or more object detectors; determine that the ROI is outside of a second FOV of each of the one or more image sensors; and based on determining that the ROI is outside of the second FOV of each of the one or more image sensors, run the one or more image sensors in the first lower-power mode with the one or more object detectors in the first mode associated with the third lower-power consumption.

Aspect 12. The apparatus of any of Aspects 1 to 11, wherein the one or more processors are configured to: determine that the ROI is within respective FOVs of a set of image sensors from the plurality of image sensors; coordinate a capture of camera exposures across at least a portion of the set of image sensors; and generate one or more images based on the camera exposures captured using at least the portion of the set of image sensors.

Aspect 13. The apparatus of any of Aspects 1 to 12, wherein the one or more processors are configured to: determine, based on a movement of at least one of the electronic device and the ROI, that the ROI is outside of the FOV of the first image sensor and within a different FOV of a second image sensor from the plurality of image sensors; based on determining that the ROI is outside of the FOV of the first image sensor and within the different FOV of the second image sensor, reduce a power mode associated with the first image sensor and increase an additional power mode associated with the second image sensor; and capture, by the second image sensor, one or more additional images of the ROI.

Aspect 14. The apparatus of Aspect 13, wherein, to increase the additional power mode associated with the second image sensor, the one or more processors are configured to at least one of turn on the second image sensor, increase a resolution of the second image sensor, increase a framerate of the second image sensor, and process data from the second image sensor using one or more resources having a higher power consumption than one or more different resources associated with the reduced power mode associated with the first image sensor.

Aspect 15. The apparatus of any of Aspects 1 to 14, wherein the one or more processors are configured to: determine, based on a movement of at least one of the electronic device and the ROI, that the ROI is within a first portion of the FOV of the first image sensor and a second portion of a different FOV of a second image sensor from the plurality of image sensors; determine a trajectory of the ROI relative to the FOV and the different FOV; based on the trajectory of the ROI, switch from the first image sensor to the second image sensor, wherein switching from the first image sensor to the second image sensor comprises reducing a power mode associated with the first image sensor and increasing an additional power mode associated with the second image sensor; and capture, by the second image sensor, one or more additional images of the ROI.

Aspect 16. The apparatus of any of Aspects 1 to 15, wherein the one or more processors are configured to: track a location of the ROI based on the one or more images captured by the first image sensor; and adjust one or more power modes associated with one or more image sensors from the plurality of image sensors, the one or more power modes being adjusted based on the location of the ROI and one or more properties of the one or more image sensors.

Aspect 17. The apparatus of any of Aspects 1 to 16, wherein the apparatus comprises a mobile device.

Aspect 18. The apparatus of any of Aspects 1 to 17, wherein the apparatus comprises the electronic device, and wherein the electronic device comprises an XR device.

Aspect 19. The apparatus of any of Aspects 1 to 18, wherein the apparatus further comprises the plurality of image sensors.

Aspect 20. A method comprising: initializing a plurality of image sensors of an electronic device, each image sensor of the plurality of image sensors being initialized in a first lower-power mode associated with a first lower power consumption that is lower than a higher-power mode supported by one or more image sensors of the plurality of image sensors; obtaining a plurality of images captured by the plurality of image sensors in the first lower-power mode; determining, based on the plurality of images, that a region-of-interest (ROI) in a scene is within a field-of-view (FOV) of a first image sensor from the plurality of image sensors; based on determining that the ROI is within the FOV of the first image sensor, decreasing the first lower-power mode of one or more second image sensors from the plurality of image sensors to one of a power-off mode or a second lower-power mode associated with a second lower power consumption that is lower than the first lower-power mode; and capturing, using the first image sensor, one or more images of the ROI.

Aspect 21. The method of Aspect 20, further comprising: based on determining that the ROI is within the FOV of the first image sensor, transitioning the first image sensor from the first lower-power mode to the higher-power mode; and capturing the one or more images of the ROI using the first image sensor in the higher-power mode.

Aspect 22. The method of Aspect 21, wherein transitioning the first image sensor from the first lower-power mode to the higher-power mode comprises: based on determining that the ROI is within the FOV of the first image sensor, adjusting a first exposure setting of the first image sensor; and based on a determination that the ROI is outside of one or more FOVs of the one or more second image sensors, adjusting at least one of a sleep setting and a second exposure setting of the one or more second image sensors.

Aspect 23. The method of any of Aspects 21 to 22, wherein transitioning the first image sensor from the first lower-power mode to the higher-power mode comprises: processing data from the one or more second image sensors using one or more resources having a lower power consumption than one or more other resources used to process the one or more images captured by the first image sensor.

Aspect 24. The method of Aspect 21, wherein transitioning the first image sensor from the first lower-power mode to the higher-power mode comprises at least one of turning off the one or more second image sensors, reducing a resolution of the one or more second image sensors, and reducing a framerate of the one or more second image sensors.

Aspect 25. The method of any of Aspects 20 to 24, further comprising: determining that the ROI is within an overlapping portion of the FOV of the first image sensor and a different FOV of a second image sensor from the plurality of image sensors; determining a first power cost associated with the first image sensor and a second power cost associated with the second image sensor; and adjusting a power mode of the first image sensor and the second image sensor based on the first power cost and the second power cost.

Aspect 26. The method of Aspect 25, wherein adjusting the power mode of the first image sensor and the second image sensor comprises: increasing the power mode of the second image sensor, the second image sensor having a lower power cost than the second image sensor; and decreasing the power mode of the first image sensor.

Aspect 27. The method of any of Aspects 25 to 26, wherein determining the first power cost and the second power cost comprises: applying a first weight associated with the first image sensor to the first power cost and a second weight associated with the second image sensor to the second power cost.

Aspect 28. The method of any of Aspects 25 to 27, wherein the first weight and the second weight are based on at least one of a respective image quality attribute associated with the first image sensor and the second image sensor, a respective power consumption associated with the first image sensor and the second image sensor, and one or more respective processing capabilities associated with the first image sensor and the second image sensor.

Aspect 29. The method of Aspect 26, further comprising: capturing an image of the ROI using the second image sensor, wherein the second image sensor is associated with a lower image quality attribute than the first image sensor; and adjusting, using a neural network, one or more visual characteristics of the image based on at least one of the image, at least an additional image of the ROI captured by the first image sensor, and motion information associated with the image.

Aspect 30. The method of any of Aspects 20 to 29, further comprising: initializing one or more object detectors for one or more image sensors from the plurality of image sensors, the one or more object detectors being initialized in a first mode associated with a third lower-power consumption that is lower than a second mode supported by the one or more object detectors; determining that the ROI is outside of a second FOV of each of the one or more image sensors; and based on determining that the ROI is outside of the second FOV of each of the one or more image sensors, running the one or more image sensors in the first lower-power mode with the one or more object detectors in the first mode associated with the third lower-power consumption.

Aspect 31. The method of any of Aspects 20 to 30, further comprising: determining that the ROI is within respective FOVs of a set of image sensors from the plurality of image sensors; coordinating a capture of camera exposures across at least a portion of the set of image sensors; and generating one or more images based on the camera exposures captured using at least the portion of the set of image sensors.

Aspect 32. The method of any of Aspects 20 to 31, further comprising: determining, based on a movement of at least one of the electronic device and the ROI, that the ROI is outside of the FOV of the first image sensor and within a different FOV of a second image sensor from the plurality of image sensors; based on determining that the ROI is outside of the FOV of the first image sensor and within the different FOV of the second image sensor, reducing a power mode associated with the first image sensor and increase an additional power mode associated with the second image sensor; and capturing, by the second image sensor, one or more additional images of the ROI.

Aspect 33. The method of Aspect 32, wherein increasing the additional power mode associated with the second image sensor comprises at least one of turn on the second image sensor, increase a resolution of the second image sensor, increase a framerate of the second image sensor, and process data from the second image sensor using one or more resources having a higher power consumption than one or more different resources associated with the reduced power mode associated with the first image sensor.

Aspect 34. The method of any of Aspects 20 to 33, further comprising: determining, based on a movement of at least one of the electronic device and the ROI, that the ROI is within a first portion of the FOV of the first image sensor and a second portion of a different FOV of a second image sensor from the plurality of image sensors; determining a trajectory of the ROI relative to the FOV and the different FOV; based on the trajectory of the ROI, switching from the first image sensor to the second image sensor, wherein switching from the first image sensor to the second image sensor comprises reducing a power mode associated with the first image sensor and increasing an additional power mode associated with the second image sensor; and capturing, by the second image sensor, one or more additional images of the ROI.

Aspect 35. The method of any of Aspects 20 to 34, further comprising: tracking a location of the ROI based on the one or more images captured by the first image sensor; and adjusting one or more power modes associated with one or more image sensors from the plurality of image sensors, the one or more power modes being adjusted based on the location of the ROI and one or more properties of the one or more image sensors.

Aspect 36. The method of any of Aspects 20 to 35, wherein the electronic device comprises an extended reality (XR) device, and wherein the XR device comprises the plurality of image sensors.

Aspect 37. A non-transitory computer-readable medium having stored thereon instructions that, when executed by one or more processors, cause the one or more processors to perform a method according to any of Aspects 20 to 36.

Aspect 38. An apparatus comprising means for performing a method according to any of Aspects 20 to 35.

Aspect 39. The apparatus of Aspect 38, wherein the apparatus comprises a mobile device.

Aspect 40. The apparatus of any of Aspects 38 to 39, wherein the apparatus comprises the electronic device, and wherein the electronic device comprises an XR device.

Aspect 41. The apparatus of any of Aspects 38 to 40, wherein the apparatus further comprises the plurality of image sensors.

What is claimed is:

1. An apparatus for capturing at least one image, comprising:
    a memory; and
    one or more processors coupled to the memory, the one or more processors being configured to:
        initialize a plurality of image sensors of an electronic device, each image sensor of the plurality of image sensors being initialized in a first lower-power mode associated with a first lower power consumption that is lower than a higher-power mode supported by one or more image sensors of the plurality of image sensors;
        obtain a plurality of images captured by the plurality of image sensors in the first lower-power mode;
        determine, based on the plurality of images, that a region-of-interest (ROI) in a scene is within a field-of-view (FOV) of a first image sensor from the plurality of image sensors;
        based on determining that the ROI is within the FOV of the first image sensor, decrease the first lower-power mode of one or more second image sensors from the plurality of image sensors to one of a power-off mode or a second lower-power mode associated with a second lower power consumption that is lower than the first lower-power mode; and
        capture, using the first image sensor, one or more images of the ROI.

2. The apparatus of claim 1, wherein the one or more processors are configured to:
    based on determining that the ROI is within the FOV of the first image sensor, transition the first image sensor from the first lower-power mode to the higher-power mode; and
    capture the one or more images of the ROI using the first image sensor in the higher-power mode.

3. The apparatus of claim 2, wherein, to transition the first image sensor from the first lower-power mode to the higher-power mode, the one or more processors are configured to:
    based on determining that the ROI is within the FOV of the first image sensor, adjust a first exposure setting of the first image sensor; and
    based on a determination that the ROI is outside of one or more FOVs of the one or more second image sensors, adjust at least one of a sleep setting and a second exposure setting of the one or more second image sensors.

4. The apparatus of claim 2, wherein, to transition the first image sensor from the first lower-power mode to the higher-power mode, the one or more processors are configured to:
    process data from the one or more second image sensors using one or more resources having a lower power consumption than one or more other resources used to process the one or more images captured by the first image sensor.

5. The apparatus of claim 2, wherein, to transition the first image sensor from the first lower-power mode to the higher-power mode, the one or more processors are configured to at least one of turn off the one or more second image sensors, reduce a resolution of the one or more second image sensors, and reduce a framerate of the one or more second image sensors.

6. The apparatus of claim 1, wherein the one or more processors are configured to:
    determine that the ROI is within an overlapping portion of the FOV of the first image sensor and a different FOV of a second image sensor from the plurality of image sensors;
    determine a first power cost associated with the first image sensor and a second power cost associated with the second image sensor; and
    adjust a power mode of the first image sensor and the second image sensor based on the first power cost and the second power cost.

7. The apparatus of claim 6, wherein, to adjust the power mode of the first image sensor and the second image sensor, the one or more processors are configured to:
    increase the power mode of the second image sensor, the second image sensor having a lower power cost than the second image sensor; and
    decrease the power mode of the first image sensor.

8. The apparatus of claim 6, wherein, to determine the first power cost and the second power cost, the one or more processors are configured to:
    apply a first weight associated with the first image sensor to the first power cost and a second weight associated with the second image sensor to the second power cost.

9. The apparatus of claim 8, wherein the first weight and the second weight are based on at least one of a respective image quality attribute associated with the first image sensor and the second image sensor, a respective power consumption associated with the first image sensor and the second image sensor, and one or more respective processing capabilities associated with the first image sensor and the second image sensor.

10. The apparatus of claim 7, wherein the one or more processors are configured to:
    capture an image of the ROI using the second image sensor, wherein the second image sensor is associated with a lower image quality attribute than the first image sensor; and
    adjust, using a neural network, one or more visual characteristics of the image based on at least one of the image, at least an additional image of the ROI captured by the first image sensor, and motion information associated with the image.

11. The apparatus of claim 1, wherein the one or more processors are configured to:
    initialize one or more object detectors for one or more image sensors from the plurality of image sensors, the one or more object detectors being initialized in a first mode associated with a third lower-power consumption that is lower than a second mode supported by the one or more object detectors;
    determine that the ROI is outside of a second FOV of each of the one or more image sensors; and
    based on determining that the ROI is outside of the second FOV of each of the one or more image sensors, run the one or more image sensors in the first lower-power mode with the one or more object detectors in the first mode associated with the third lower-power consumption.

12. The apparatus of claim 1, wherein the one or more processors are configured to:
   determine that the ROI is within respective FOVs of a set of image sensors from the plurality of image sensors;
   coordinate a capture of camera exposures across at least a portion of the set of image sensors; and
   generate one or more images based on the camera exposures captured using at least the portion of the set of image sensors.

13. The apparatus of claim 1, wherein the one or more processors are configured to:
   determine, based on a movement of at least one of the electronic device and the ROI, that the ROI is outside of the FOV of the first image sensor and within a different FOV of a second image sensor from the plurality of image sensors;
   based on determining that the ROI is outside of the FOV of the first image sensor and within the different FOV of the second image sensor, reduce a power mode associated with the first image sensor and increase an additional power mode associated with the second image sensor; and
   capture, by the second image sensor, one or more additional images of the ROI.

14. The apparatus of claim 13, wherein, to increase the additional power mode associated with the second image sensor, the one or more processors are configured to at least one of turn on the second image sensor, increase a resolution of the second image sensor, increase a framerate of the second image sensor, and process data from the second image sensor using one or more resources having a higher power consumption than one or more different resources associated with the reduced power mode associated with the first image sensor.

15. The apparatus of claim 1, wherein the one or more processors are configured to:
   determine, based on a movement of at least one of the electronic device and the ROI, that the ROI is within a first portion of the FOV of the first image sensor and a second portion of a different FOV of a second image sensor from the plurality of image sensors;
   determine a trajectory of the ROI relative to the FOV and the different FOV;
   based on the trajectory of the ROI, switch from the first image sensor to the second image sensor, wherein switching from the first image sensor to the second image sensor comprises reducing a power mode associated with the first image sensor and increasing an additional power mode associated with the second image sensor; and
   capture, by the second image sensor, one or more additional images of the ROI.

16. The apparatus of claim 1, wherein the one or more processors are configured to:
   track a location of the ROI based on the one or more images captured by the first image sensor; and
   adjust one or more power modes associated with one or more image sensors from the plurality of image sensors, the one or more power modes being adjusted based on the location of the ROI and one or more properties of the one or more image sensors.

17. The apparatus of claim 1, wherein the apparatus comprises a mobile device.

18. The apparatus of claim 1, wherein the apparatus comprises the electronic device, and wherein the electronic device comprises an XR device.

19. The apparatus of claim 1, wherein the apparatus further comprises the plurality of image sensors.

20. A method of capturing at least one image, comprising:
   initializing a plurality of image sensors of an electronic device, each image sensor of the plurality of image sensors being initialized in a first lower-power mode associated with a first lower power consumption that is lower than a higher-power mode supported by one or more image sensors of the plurality of image sensors;
   obtaining a plurality of images captured by the plurality of image sensors in the first lower-power mode;
   determining, based on the plurality of images, that a region-of-interest (ROI) in a scene is within a field-of-view (FOV) of a first image sensor from the plurality of image sensors;
   based on determining that the ROI is within the FOV of the first image sensor, decreasing the first lower-power mode of one or more second image sensors from the plurality of image sensors to one of a power-off mode or a second lower-power mode associated with a second lower power consumption that is lower than the first lower-power mode; and
   capturing, using the first image sensor, one or more images of the ROI.

21. The method of claim 20, further comprising:
   based on determining that the ROI is within the FOV of the first image sensor, transitioning the first image sensor from the first lower-power mode to the higher-power mode; and
   capturing the one or more images of the ROI using the first image sensor in the higher-power mode.

22. The method of claim 21, wherein transitioning the first image sensor from the first lower-power mode to the higher-power mode comprises:
   based on determining that the ROI is within the FOV of the first image sensor, adjusting a first exposure setting of the first image sensor; and
   based on a determination that the ROI is outside of one or more FOVs of the one or more second image sensors, adjusting at least one of a sleep setting and a second exposure setting of the one or more second image sensors.

23. The method of claim 21, wherein transitioning the first image sensor from the first lower-power mode to the higher-power mode comprises:
   processing data from the one or more second image sensors using one or more resources having a lower power consumption than one or more other resources used to process the one or more images captured by the first image sensor.

24. The method of claim 21, wherein transitioning the first image sensor from the first lower-power mode to the higher-power mode comprises at least one of turning off the one or more second image sensors, reducing a resolution of the one or more second image sensors, and reducing a framerate of the one or more second image sensors.

25. The method of claim 20, further comprising:
   determining that the ROI is within an overlapping portion of the FOV of the first image sensor and a different FOV of a second image sensor from the plurality of image sensors;
   determining a first power cost associated with the first image sensor and a second power cost associated with the second image sensor; and
   adjusting a power mode of the first image sensor and the second image sensor based on the first power cost and the second power cost.

26. The method of claim 25, wherein adjusting the power mode of the first image sensor and the second image sensor comprises:
- increasing the power mode of the second image sensor, the second image sensor having a lower power cost than the second image sensor; and
- decreasing the power mode of the first image sensor.

27. The method of claim 25, wherein determining the first power cost and the second power cost comprises:
- applying a first weight associated with the first image sensor to the first power cost and a second weight associated with the second image sensor to the second power cost.

28. The method of claim 27, wherein the first weight and the second weight are based on at least one of a respective image quality attribute associated with the first image sensor and the second image sensor, a respective power consumption associated with the first image sensor and the second image sensor, and one or more respective processing capabilities associated with the first image sensor and the second image sensor.

29. The method of claim 26, further comprising:
- capturing an image of the ROI using the second image sensor, wherein the second image sensor is associated with a lower image quality attribute than the first image sensor; and
- adjusting, using a neural network, one or more visual characteristics of the image based on at least one of the image, at least an additional image of the ROI captured by the first image sensor, and motion information associated with the image.

30. The method of claim 20, further comprising:
- initializing one or more object detectors for one or more image sensors from the plurality of image sensors, the one or more object detectors being initialized in a first mode associated with a third lower-power consumption that is lower than a second mode supported by the one or more object detectors;
- determining that the ROI is outside of a second FOV of each of the one or more image sensors; and
- based on determining that the ROI is outside of the second FOV of each of the one or more image sensors, running the one or more image sensors in the first lower-power mode with the one or more object detectors in the first mode associated with the third lower-power consumption.

31. The method of claim 20, further comprising:
- determining that the ROI is within respective FOVs of a set of image sensors from the plurality of image sensors;
- coordinating a capture of camera exposures across at least a portion of the set of image sensors; and
- generating one or more images based on the camera exposures captured using at least the portion of the set of image sensors.

32. The method of claim 20, further comprising:
- determining, based on a movement of at least one of the electronic device and the ROI, that the ROI is outside of the FOV of the first image sensor and within a different FOV of a second image sensor from the plurality of image sensors;
- based on determining that the ROI is outside of the FOV of the first image sensor and within the different FOV of the second image sensor, reducing a power mode associated with the first image sensor and increase an additional power mode associated with the second image sensor; and
- capturing, by the second image sensor, one or more additional images of the ROI.

33. The method of claim 32, wherein increasing the additional power mode associated with the second image sensor comprises at least one of turn on the second image sensor, increase a resolution of the second image sensor, increase a framerate of the second image sensor, and process data from the second image sensor using one or more resources having a higher power consumption than one or more different resources associated with the reduced power mode associated with the first image sensor.

34. The method of claim 20, further comprising:
- determining, based on a movement of at least one of the electronic device and the ROI, that the ROI is within a first portion of the FOV of the first image sensor and a second portion of a different FOV of a second image sensor from the plurality of image sensors;
- determining a trajectory of the ROI relative to the FOV and the different FOV;
- based on the trajectory of the ROI, switching from the first image sensor to the second image sensor, wherein switching from the first image sensor to the second image sensor comprises reducing a power mode associated with the first image sensor and increasing an additional power mode associated with the second image sensor; and
- capturing, by the second image sensor, one or more additional images of the ROI.

35. The method of claim 20, further comprising:
- tracking a location of the ROI based on the one or more images captured by the first image sensor; and
- adjusting one or more power modes associated with one or more image sensors from the plurality of image sensors, the one or more power modes being adjusted based on the location of the ROI and one or more properties of the one or more image sensors.

36. The method of claim 20, wherein the electronic device comprises an extended reality (XR) device, and wherein the XR device comprises the plurality of image sensors.

37. A non-transitory computer-readable medium having stored thereon instructions that, when executed by one or more processors, cause the one or more processors to:
- initialize a plurality of image sensors of an electronic device, each image sensor of the plurality of image sensors being initialized in a first lower-power mode associated with a first lower power consumption that is lower than a higher-power mode supported by one or more image sensors of the plurality of image sensors;
- obtain a plurality of images captured by the plurality of image sensors in the first lower-power mode;
- determine, based on the plurality of images, that a region-of-interest (ROI) in a scene is within a field-of-view (FOV) of a first image sensor from the plurality of image sensors;
- based on determining that the ROI is within the FOV of the first image sensor, decrease the first lower-power mode of one or more second image sensors from the plurality of image sensors to one of a power-off mode or a second lower-power mode associated with a second lower power consumption that is lower than the first lower-power mode; and
- capture, using the first image sensor, one or more images of the ROI.

* * * * *